United States Patent
Nakagawa et al.

(10) Patent No.: US 10,009,265 B2
(45) Date of Patent: Jun. 26, 2018

(54) COMMUNICATION CONTROL APPARATUS, COMMUNICATION CONTROL METHOD, COMMUNICATION SYSTEM, AND RECORDING MEDIUM

(71) Applicant: FUJITSU LIMITED, Kawasaki-shi, Kanagawa (JP)

(72) Inventors: Itaru Nakagawa, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 14/868,375

(22) Filed: Sep. 28, 2015

(65) Prior Publication Data

US 2016/0021001 A1 Jan. 21, 2016

Related U.S. Application Data

(63) Continuation of application No. PCT/JP2013/059608, filed on Mar. 29, 2013.

(51) Int. Cl.
 *H04L 12/741* (2013.01)
 *H04L 12/64* (2006.01)
 *H04L 12/707* (2013.01)

(52) U.S. Cl.
 CPC .......... *H04L 45/54* (2013.01); *H04L 12/6418* (2013.01); *H04L 45/22* (2013.01)

(58) Field of Classification Search
 CPC ....... H04L 45/22; H04L 45/54; H04L 12/721; H04L 12/66
 See application file for complete search history.

(56) References Cited

U.S. PATENT DOCUMENTS

2003/0228015 A1 12/2003 Futa et al.
2010/0100618 A1* 4/2010 Kuhlke ................... H04L 43/00
                                                         709/224

(Continued)

FOREIGN PATENT DOCUMENTS

JP    2004056340 A  *  2/2004
JP    2004-080743       3/2004

(Continued)

OTHER PUBLICATIONS

Foreign Patent Application (Translated): Feb. 2004—Shimozu, Hiroaki—JP2004056340A (English Translated).*

(Continued)

*Primary Examiner* — Sulaiman Nooristany
(74) *Attorney, Agent, or Firm* — Fujitsu Patent Center

(57) ABSTRACT

A communication control apparatus for switching a communication route from a first apparatus to a second apparatus based on apparatus identification information identifying the second apparatus, the communication control apparatus including: a table storage unit configured to store the apparatus identification information; a storage unit configured to store communication information of communication to the second apparatus with which the communication is performed; and a control unit configured to determine whether or not the control unit stores the apparatus identification information of the second apparatus starting the communication in the table storage unit based on the communication information stored in the storage unit and an information amount of the apparatus identification information capable of storing in the table storage unit.

12 Claims, 20 Drawing Sheets

(56) References Cited

U.S. PATENT DOCUMENTS

2012/0011264 A1\* 1/2012 Izawa ................ H04L 47/2483
 709/230
2014/0211807 A1 7/2014 Takenaka et al.

FOREIGN PATENT DOCUMENTS

| JP | 2004-145695 | 5/2004 |
| JP | 2008-048055 | 2/2008 |
| JP | 2010-182081 | 8/2010 |
| WO | 2013069161 | 5/2013 |

OTHER PUBLICATIONS

International Search Report, mailed in connection with PCT/JP2013/059608 dated Jun. 25, 2013 (2 pages).

\* cited by examiner

| TIME ZONE | LOCATION 1(SSID1) | LOCATION 2(SSID2) | |
|---|---|---|---|
| ... | ... | ... | ... |
| 9:15-9:30 | {FQDN1, 0:40:0, 0:45:0, 2 TIMES}<br>{FQDN2, 0:0:2, 0:0:2, 1 TIME} | | ... |
| ... | ... | ... | ... |

| START TIME | LOCATION | COMMUNICATION OPPOSITE PARTY | COMPLETION TIME |
|---|---|---|---|
| 09:15:00 | SSID1 | FQDN1 | 10:15:00 |
| 09:16:00 | SSID1 | FQDN2 | 09:16:05 |
| 09:16:20 | SSID1 | FQDN2 | 09:16:22 |
| 09:17:00 | SSID1 | FQDN3 | 09:17:05 |

FIG. 10

| TIME ZONE | LOCATION 1(SSID1) | LOCATION 2(SSID2) | |
|---|---|---|---|
| ... | ... | ... | ... |
| 9:15-9:30 | {FQDN1, 0:40:0, 1:0:0, 3 TIMES}<br>{FQDN2, 0:0:2, 0:0:5, 3 TIMES}<br>{FQDN3, 0:0:5, 0:0:5, 1 TIME} | ... | |
| ... | ... | ... | ... |

| SEGMENT (TIME ZONE) | LOCATION 0 (SSID0) | LOCATION 1 (SSID1) | LOCATION 2 (SSID2) | ... |
|---|---|---|---|---|
| SEGMENT T1 (9:00-9:15) | ... | ... | ... | ... |
| SEGMENT T2 (9:15-9:30) | ... | {FQDN13, 0:50:0, 1:00:0, 2 TIMES}<br>{FQDN4, 0:0:4, 0:0:5, 4 TIMES} ← V2 | ... | ... |
| SEGMENT T3 (9:30-9:45) | ... | {FQDN12, 0:35:0, 1:15:0, 3 TIMES}<br>{FQDN2, 0:0:2, 0:0:7, 4 TIMES}<br>{FQDN3, 0:0:3, 0:0:5, 4 TIMES} ← V1 | ... | ... |
| SEGMENT T4 (9:45-10:00) | ... | {FQDN1, 0:30:0, 1:20:0, 2 TIMES}<br>{FQDN3, 0:0:4, 0:0:6, 6 TIMES}<br>{FQDN4, 0:0:5, 0:0:5, 2 TIMES} ← V3 | ... | ... |
| ... | ... | ... | ... | ... |

FIG. 15

| CATEGORY | COMMUNICATION TIME (1 SESSION) | NUMBER OF COMMUNICATION TIMES (1 DAY) | TENDENCY |
|---|---|---|---|
| CONFERENCE SYSTEM, STREAMING SYSTEM | SEVERAL TENS OF SECONDS IN THE CASE OF BEING SHORT, WHEREAS SEVERAL HOURS OR MORE IN THE CASE OF BEING LONG | LOW (1 TO SEVERAL TIMES) | COMMUNICATION TIME DIFFERENCE: LARGE, DIFFERENCE IN THE NUMBER OF COMMUNICATION TIMES: SMALL |
| OTHERS (SEARCH SYSTEM, BROWSING SYSTEM) | AROUND SEVERAL SECONDS | LOW TO HIGH (HUNDRED TIMES) | COMMUNICATION TIME DIFFERENCE: SMALL, DIFFERENCE IN THE NUMBER OF COMMUNICATION TIMES: LARGE |

| RANKING | COMMUNICATION OPPOSITE PARTY |
|---|---|
| (ALREADY STORED) | FQDN13 |
| 1 | FQDN12 |
| 2 | FQDN1 |
| 3 | FQDN3 |
| 4 | FQDN4 |
| 5 | FQDN2 |

FIG. 17

| COMMUNICATION OPPOSITE PARTY | CATEGORY |
|---|---|
| FQDN1 | C1 |
| FQDN2 | C3 |
| FQDN3 | C3 |
| FQDN4 | C2 |
| FQDN5 | C2 |
| ... | ... |
| FQDN12 | C1 |
| FQDN13 | C1 |

| SEGMENT | LOCATION 1(SSID1) |
|---|---|
| SEGMENT T2 (9:15-9:30) | { C1,1, 0:50:0, 1:00:0, 2 TIMES }<br>{ C2, 1, 0:0:4, 0:0:5, 4 TIMES } |
| SEGMENT T3 (9:30-9:45) | { C1, 1, 0:35:0, 1:15:0, 3 TIMES }<br>{ C3, 2, 0:0:2, 0:0:7, 8 TIMES } |
| SEGMENT T4 (9:45-10:00) | { C1, 1, 0:30:0, 1:20:0, 2 TIMES }<br>{ C3, 1, 0:0:4 0:0:6, 6 TIMES }<br>{ C2, 1, 0:0:5, 0:0:5, 2 TIMES } |

| RANKING | CATEGORY | COMMUNICATION OPPOSITE PARTY COUNT |
|---|---|---|
| 1 | C1 | 3 |
| 2 | C3 | 3 |
| 3 | C2 | 2 |

TO2

COMMUNICATION CONTROL APPARATUS, COMMUNICATION CONTROL METHOD, COMMUNICATION SYSTEM, AND RECORDING MEDIUM

CROSS-REFERENCE TO RELATED APPLICATION

This application is a continuation application of International Application No. PCT/JP2013/059608 filed on Mar. 29, 2013 and designated the U.S., the entire contents of which are incorporated herein by reference.

FIELD

The embodiments discusses herein are related to a communication control apparatus, a communication control method, a communication system, and a recording medium.

BACKGROUND

There is proposed an apparatus which switches a connection destination site based on a white list which stores a reliable connection destination site.

The apparatus of concern receives a connection request from a client terminal. Then, the apparatus of concern connects to the connection destination site, if a connection destination site is stored in the white list. On the other hand, if a connection destination site which the received connection request indicates is not stored in the white list, the apparatus of concern, on receiving for example, a connection request from the client terminal to connect to a substitutive site, connects to the substitutive site.

Patent Literature 1: Japanese Laid-open Patent Publication No. 2010-182081.

There is another apparatus which switches a communication route of a communication packet received from a client terminal, based on a white list which stores identification information for identifying a reliable communication opposite party. On receiving a communication start request from the client terminal, if information for identifying a communication opposite party of the client terminal is stored in the white list, the apparatus of concern stores information (for example, an IP address) for identifying an apparatus corresponding to the communication opposite party of concern, into a routing table. On the other hand, if information for identifying a communication opposite party of the client terminal is not stored in the white list, the apparatus of concern does not store information for identifying an apparatus corresponding to the communication opposite party into the routing table.

Thereafter, the apparatus of concern, on receiving a communication packet from the client terminal, collates a destination IP address included in the communication packet with the routing table, to confirm whether the destination IP address is stored in the routing table (hereafter appropriately described as collation processing and confirmation processing).

Then, when the destination IP address is stored in the routing table, the apparatus of concern transfers the communication packet received from the client terminal to a first communication route. Here, the first communication route is, for example, a communication route which does not include a VPN (Virtual Private Network).

On the other hand, when the destination IP address is not stored in the routing table, the apparatus of concern transfers the communication packet received from the client terminal to a second communication route. Here, the second communication route is, for example, a communication route which includes a VPN. Incidentally, the above communication packet is transferred to an apparatus corresponding to the communication opposite party through the communication route.

Now, there is assumed a case such that the client terminal simultaneously communicates with a multiplicity of communication opposite parties stored in the white list. In this case, each IP address of apparatuses corresponding to the multiplicity of communication opposite parties is stored in the routing table. The apparatus of concern, when simultaneously communicating with the multiplicity of communication opposite parties, may simultaneously execute the above-mentioned collation processing and the confirmation processing for each communication packet, causing increased processing loads for the collation processing and the confirmation processing.

As a result, transfer processing for the communication packet in the apparatus of concern delays, causing an arrival delay of the communication packet from the client terminal to each communication opposite party. As a result, there is deterioration in the quality of a communication service which the apparatus of concern provides to the client.

SUMMARY

According to an aspect of the embodiments, a communication control apparatus for switching a communication route from a first apparatus to a second apparatus based on apparatus identification information identifying the second apparatus, the communication control apparatus including: a table storage unit configured to store the apparatus identification information; a storage unit configured to store communication information of communication to the second apparatus with which the communication is performed; and a control unit configured to determine whether or not the control unit stores the apparatus identification information of the second apparatus starting the communication in the table storage unit based on the communication information stored in the storage unit and an information amount of the apparatus identification information capable of storing in the table storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating one example of a aggregation table which stores a aggregation record.

FIG. 9 is a diagram illustrating one example of a table for storing communication result.

FIG. 10 is a diagram illustrating a result after an aggregation table TT1 of FIG. 8 is updated.

FIG. 11 is a diagram illustrating one example of an aggregation table updated by update processing of an aggregation table explained by FIG. 7.

FIG. 15 is a diagram illustrating communication time, a number of communication times and tendency of each category of a communication content.

FIG. 16 is one example of a table illustrating result of ranking five reaggregation records of FIG. 14, executed by a decision unit 111 based on an evaluation function.

FIG. 17 is a diagram illustrating one example of a white list in second embodiment.

FIG. 18 is a diagram illustrating an aggregation table in which an aggregation record in each communication opposite party, as denoted with symbols V1, V2, V3 of FIG. 11, is changed into category-based aggregation record set to the communication opposite party.

DESCRIPTION OF EMBODIMENTS

First Embodiment (Communication System)

Figure 1:
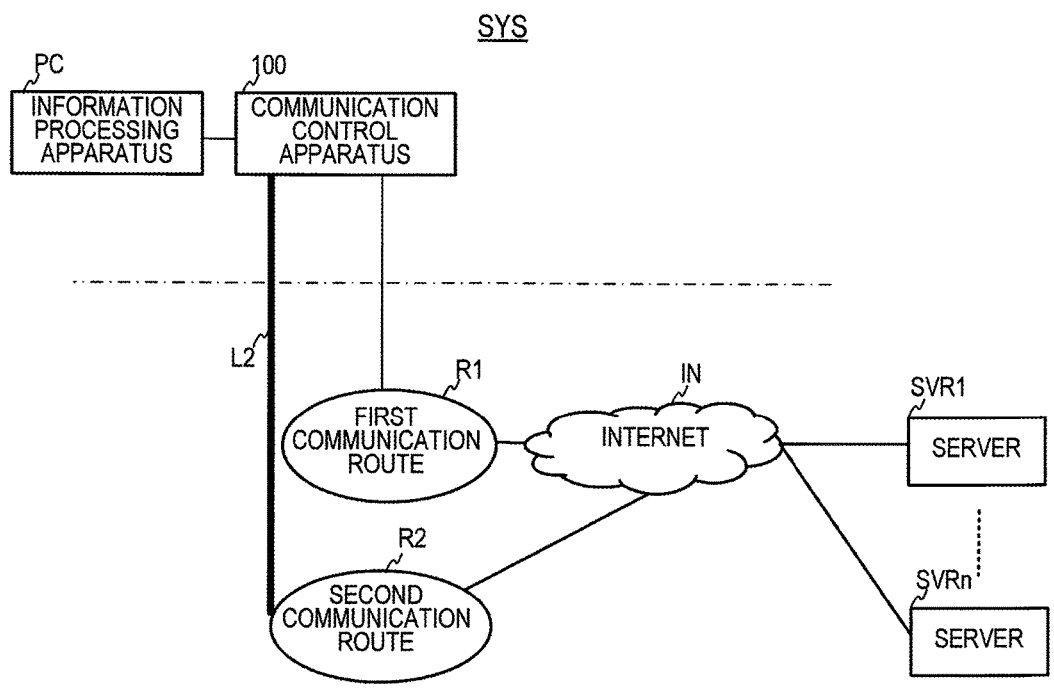
FIG. 1 is a diagram illustrating a communication system according to the present embodiment.

FIG. 1 is a diagram illustrating a communication system according to the present embodiment. In the following description of the figures, the same symbols are appropriately granted to the same elements, and the description given once will be omitted.

A user side system SYS described on the upper side of the alternate long and short dash line includes an information processing apparatus PC and a communication control apparatus 100. The information processing apparatus PC is a client terminal, such as a personal computer, connecting to the communication control apparatus 100. The information processing apparatus PC may also be another apparatus such as a tablet computer and a smart phone.

The communication control apparatus 100 is located between the information processing apparatus PC and each of a first communication route R1 and a second communication route R2, to perform transfer processing for a communication packet. Here, the communication control apparatus 100 may also be a personal computer, a tablet computer or a smart phone.

The communication control apparatus 100 connects to the first communication route R1 and the second communication route R2. The communication control apparatus 100 establishes, between with the second communication route R2 for example, a virtual communication route (hereafter appropriately described as a tunnel) which functions as a closed virtual communication route of direct connection for connecting between a first connection point (which may also be referred to as a connection node) and a second connection point. In FIG. 1, the first connection point is the communication control apparatus 100, the second connection point is a communication apparatus (not illustrated) provided on the second communication route R2. In FIG. 1, the tunnel between the first and second connection points is schematically illustrated with a symbol L2.

The communication control apparatus 100 performs the transfer (also referred to as transmission) of a communication packet received from the information processing apparatus PC to first to n-th servers SVR1-SVRn (n is an integer of 2 or greater) through the first communication route R1 and the Internet IN. Also, the communication control apparatus 100 transfers the communication packet received from the information processing apparatus PC to the first server SVR1 to the n-th server SVRn through the tunnel L2, the second communication route R2 and the Internet IN. The communication control apparatus 100 transfers each communication packet received from the first to the n-th servers SVR1-SVRn to the information processing apparatus PC.

In the following description, a communication network (which may also be referred to as a communication route) between the communication control apparatus 100 and the Internet IN through the first communication route R1 will appropriately be described as a physical network. Also, a communication network between the communication control apparatus 100 and the Internet IN through the tunnel L2 and the second communication route R2 will appropriately be described as a VPN network.

In the transmission and the reception of the communication packet, the communication control apparatus 100 uses, for example, TCP/IP (Transmission Control Protocol/Internet Protocol) as a communication protocol.

The first communication route R1 is, for example, a communication route which includes a public network installed by a common carrier which provides a variety of types of communication services including data communication etc.

The second communication route R2 is, for example, a corporate network based on an Internet standard technology. The communication apparatus (not illustrated) on the second communication route R2 includes a proxy function and a firewall function, and executes communication processing between the communication control apparatus 100 and the Internet IN.

The Internet IN connects to the first communication route R1, the second communication route R2 and the first to the n-th servers SVR1-SVRn. The first to the n-th servers SVR1-SVRn are a search server which, in response to an information search request from a user, answers the search result thereof to the user, a WEB (World Wide Web) server, a server providing a cloud service and a DNS (Domain Name System) server.

The communication control apparatus 100 is one example of an apparatus which switches a communication route from a first apparatus to a second apparatus based on apparatus identification information for identifying the second apparatus. Here, the first apparatus is, for example, the information processing apparatus PC. The second apparatus is, for example, the first server SVR1 to the n-th server SVRn. The apparatus identification information for identifying the second apparatus is, for example, an IP address.

Incidentally, the first apparatus is also referred to as a communication source apparatus, whereas the second apparatus is also referred to as a communication destination apparatus. Further, as communication routes from the first apparatus to the second apparatus, there are the above-mentioned physical network as the communication network, and the above-mentioned VPN network as the communication network.

(Transfer Apparatus)

Figure 2:
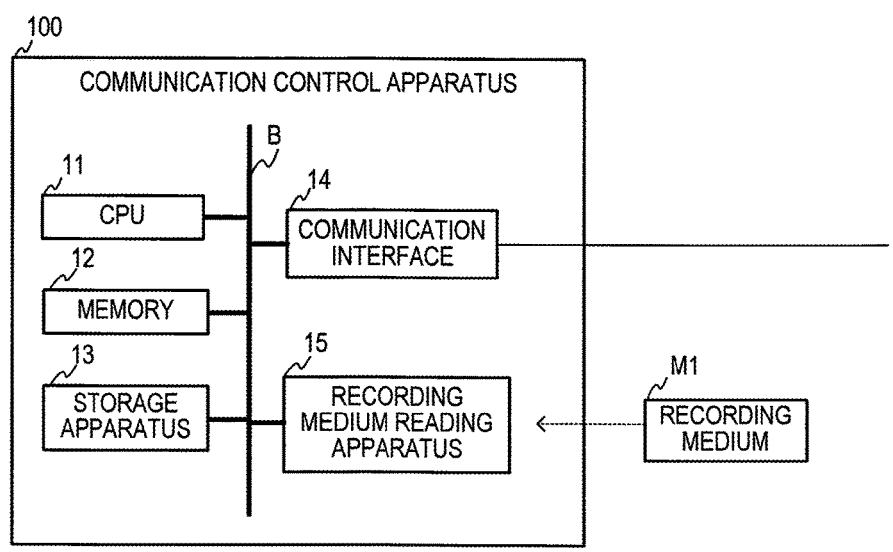
FIG. 2 is one example of a hardware block diagram of a communication control apparatus 100 of FIG. 1.

FIG. 2 is one example of a hardware block diagram of the communication control apparatus 100 of FIG. 1. The communication control apparatus 100 includes a CPU (Central Processing Unit) 11, a memory 12, a storage apparatus 13, a communication interface 14 and a recording medium reading apparatus 15 which are interconnected through a bus B, for example.

The CPU 11 is a computer (control unit) which controls the whole of the communication control apparatus 100. The memory 12 temporarily stores data processed in a variety of types of information processing which the CPU 11 executes and a variety of programs. Also, the memory 12 stores a routing table and a ranking table. The routing table will be described in FIG. 4, whereas the ranking table will be described in FIG. 16.

The storage apparatus 13 is, for example, a magnetic storage apparatus such as a hard disk drive (HDD) and a non-volatile memory. The storage apparatus 13 stores a white list, a communication result table and an aggregation table. Here, the white list will be described in FIG. 3, the communication result table will be described in FIG. 9, and the aggregation table will be described in FIG. 8. In addition, the storage apparatus 13 stores each program which will be described in FIG. 5.

The communication interface 14 is an apparatus which provides an interface function to perform communication processing with the information processing apparatus PC and a communication opposite party. Here, the communication opposite party is a communication opposite party viewed from the information processing apparatus PC and the communication control apparatus 100 side, and is each of the first server SVR1 to the n-th server SVRn.

When the communication control apparatus 100 includes, for example, a wired communication function, the communication interface 14 is what is called a network interface card (NIC). Also, when the communication control apparatus 100 includes a radio communication function, the communication interface 14 is, for example, a wireless LAN slave unit.

The recording medium reading apparatus 15 is an apparatus which reads data recorded on a recording medium M1. The recording medium M1 is, for example, a portable recording medium including a CD-ROM (Compact Disc Read Only Memory), a DVD (Digital Versatile Disc), a USB (Universal Serial Bus) memory, etc.

Figure 3:
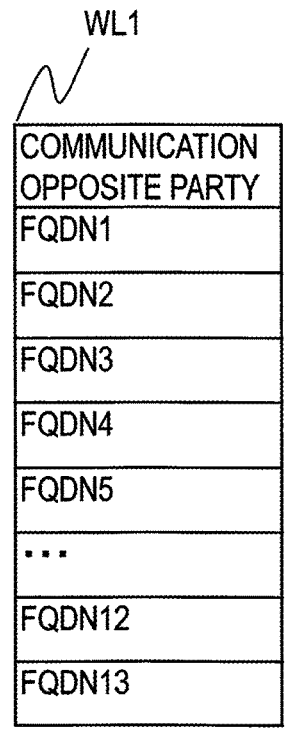
FIG. 3 is a diagram illustrating one example of a white list.

FIG. 3 is a diagram illustrating one example of a white list.

A white list WL1 includes a communication opposite party column. The communication opposite party column stores communication opposite party identification information for identifying a reliable communication opposite party. The white list WL1 stores, in the communication opposite party column, a communication opposite party FQDN1 to a communication opposite party FQDN13.

The communication opposite party identification information for identifying a communication opposite party is, for example, a fully qualified domain name (FQDN). As to the reliable communication opposite party, there is a server provided by an organization which is generally evaluated to be reliable, such as a WEB server in a government/municipal agency, for example.

Figure 4:
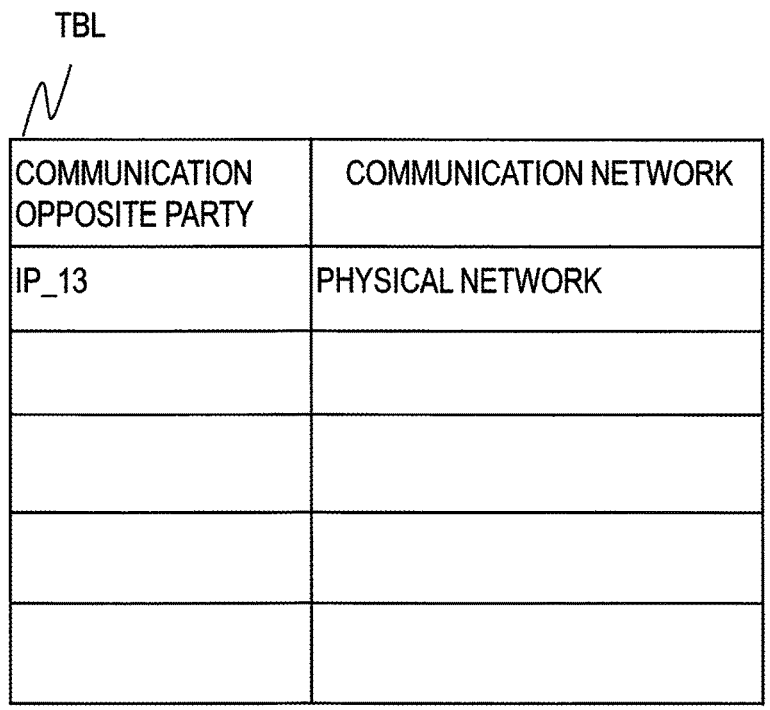
FIG. 4 is a diagram illustrating one example of a routing table.

FIG. 4 is a diagram illustrating one example of the routing table. A routing table TBL includes a communication opposite party column and a communication network column. The communication opposite party column stores apparatus identification information for identifying an apparatus (for example, the second apparatus) corresponding to a communication opposite party. The apparatus identification information is, for example, an IP address. The communication network column stores "physical network", as information for specifying a communication route, when the communication control apparatus 100 transfers to the communication opposite party a communication packet received from the information processing apparatus PC.

Here, in the routing table TBL, the number of rows excluding the uppermost row in which the "Communication opposite parties" and the "Communication networks" are described is referred to as a total entry count. The total entry count is a predetermined number, for example. In the case of the routing table TBL, the total entry count is 5, because the number of rows exclusive of the uppermost low is 5 rows. In the routing table TBL, "IP_13" and "physical network" are stored in the same row. Here, IP_13 indicates the IP address of an apparatus corresponding to FQDN13 which is the communication opposite party.

Figure 5:
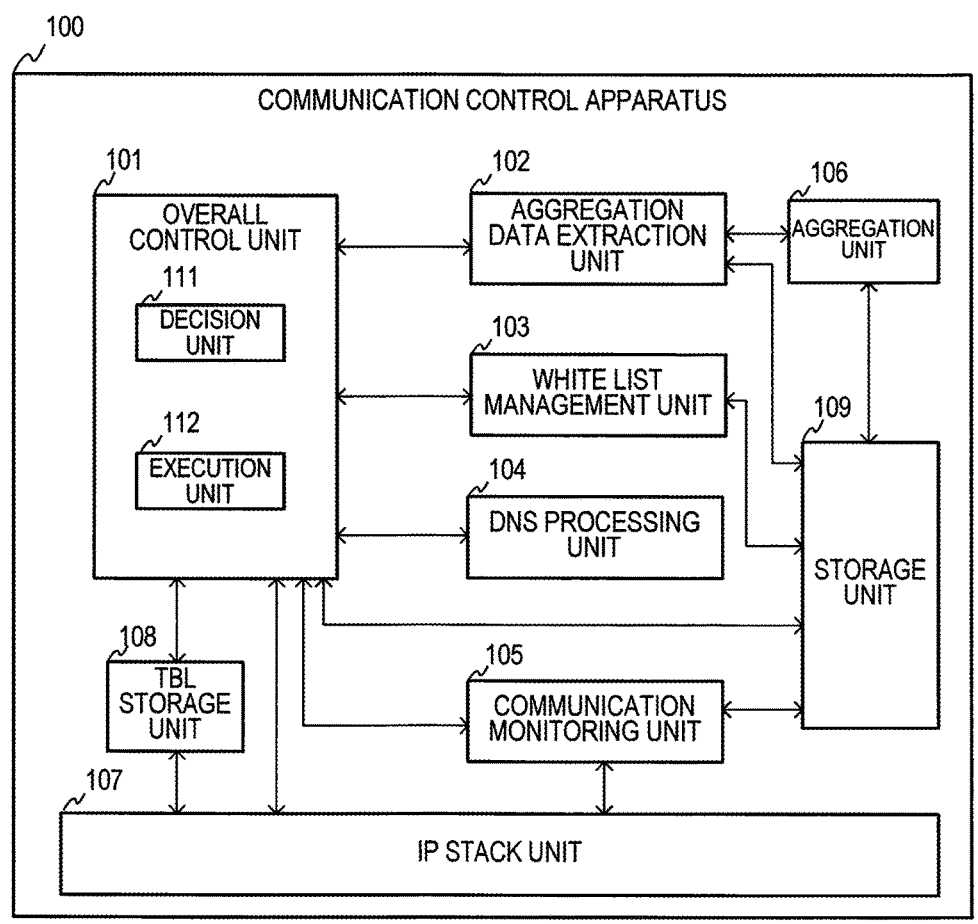
FIG. 5 is one example of a block diagram of a software module which a communication control apparatus 100 of FIG. 2 executes.

FIG. 5 is one example of the block diagram of a software module which the communication control apparatus 100 of FIG. 2 executes. An overall control unit 101, a decision unit 111, an execution unit 112, an aggregation data extraction unit 102, a white list management unit 103, a DNS processing unit 104, a communication monitoring unit 105, an aggregation unit 106 and an IP stack unit 107 are what is called programs, and the above programs are stored in the storage apparatus 13, for example. Here, the above programs may be stored in the recording medium M1.

A TBL storage unit 108 stores the routing table TBL of FIG. 4. The TBL storage unit 108 is one example of a storage unit which stores apparatus identification information for identifying the second apparatus described in FIG. 1. The TBL storage unit 108 may also be referred to as a table storage unit or a first storage unit.

The storage unit 109 stores the white list table and tables other than the routing table TBL. The tables other than the routing table TBL are the ranking table, the communication result table and the aggregation table. The storage unit 109 is also referred to as a second storage unit.

The CPU 11 of FIG. 2 reads out the above programs from the storage apparatus 13 at the time of activation, to expand to the memory 12 to make the above programs function as software modules.

The overall control unit 101 controls a variety of types of processing which the communication control apparatus 100 executes. For example, the overall control unit 101 establishes the tunnel L2 (refer to FIG. 1) between with a communication apparatus (not illustrated) of the second communication route R2, to construct a VPN.

In addition, the overall control unit 101 may dynamically determine the total entry count of the routing table TBL of FIG. 4, from the throughput of the CPU 11 and the capacity of the memory 12 of FIG. 2. For example, when the throughput of the CPU 11 has high performance (for example, 800 MHz) and the capacity of the memory 12 has a large capacity (for example, 512 Mbytes), the total entry count is set to be large (for example, 60). Also, for example, when the throughput of the CPU 11 has low performance (for example, 256 MHz) or the capacity of the memory 12 has a small capacity (64 Mbytes), the total entry count is set to be small (for example, 10). Moreover, in other cases than the above exemplification, the total entry count is set to be a medium degree (for example, 20).

The decision unit 111 determines whether the physical network or the VPN network is set to be the communication route of a communication packet received from the communication control apparatus 100. The execution unit 112 executes the update processing of the routing table TBL of FIG. 4. The aggregation data extraction unit 102 extracts, from the aggregation table, aggregation data (which may also be referred to as aggregation record) including a communication result.

The white list management unit 103 manages the white list WL1. In response to a white list change command input from a non-illustrated input apparatus (such as a keyboard and a touch panel), the white list management unit 103 stores into the white list WL1 communication opposite party identification information for identifying a reliable communication opposite party, or deletes the information from the white list WL1.

The DNS processing unit 104 executes a DNS relay function for transferring a DNS request and a DNS response between the information processing apparatus PC and a DNS server (for example, the first server SVR1 of FIG. 1). The communication monitoring unit 105 monitors a communication packet which the IP stack unit 107 transfers.

The aggregation unit 106 aggregates each communication result, which the communication result table TR1 of FIG. 9 stores, on each predetermined time basis, for example.

The IP stack unit 107 executes a variety of types of processing needed at the execution of TCP/IP communication. The IP stack unit 107 collates an IP address, which is included in each communication packet as a destination IP address, with the routing table TBL of FIG. 4, to route the communication packet. Further, the IP stack unit 107 transfers, to the information processing apparatus PC, each communication packet which is received through the physical network or the VPN network.

[Broad Description of the Communication Control Apparatus 100 of the Present Embodiment]

A broad description of the communication control apparatus 100 of the present embodiment will be given by reference to FIGS. 1-5. Here, it is assumed that the overall control unit 101 of the communication control apparatus 100 already establishes the tunnel L2 (refer to FIG. 1) between with the communication apparatus (not illustrated) of the second communication route R2 to construct the VPN.

Here, it is assumed that a user of the information processing apparatus PC is an employee of a corporation which is the owner of the second communication route R2, and the user uses the information processing apparatus PC in business. In this case, the system administrator of the corporation may monitor to which server the user makes an access, from the viewpoint of security and network management. Then, when the information processing apparatus PC executes communication with a server, the communication control apparatus 100 transfers a communication packet received from the information processing apparatus PC to a communication apparatus (not illustrated) on the second communication route R2 (VPN network). The communication apparatus monitors the communication content of the user of the communication control apparatus 100.

However, if the communication apparatus monitors all communication contents of the information processing apparatus PC, the processing load of the communication apparatus increases, and accordingly communication processing in the communication apparatus delays.

Then, when the communication opposite party of the information processing apparatus PC is a communication opposite party stored in the white list WL1, the communication control apparatus 100 communicates with the communication opposite party through the first communication route R1 and the Internet IN, without through the communication apparatus on the second communication route R2.

Specifically, if communication opposite party identification information for identifying the communication opposite party is stored in the white list WL1, the communication control apparatus 100 stores the IP address of the apparatus corresponding to the communication opposite party, into the routing table TBL of FIG. 4. On the other hand, if identification information for identifying the communication opposite party is not stored in the white list WL1, the communication control apparatus 100 does not store the IP address of the apparatus corresponding to the communication opposite party in the routing table TBL of FIG. 4.

Now, if the number of IP addresses stored in the routing table TBL is increased, the processing load in the communication control apparatus 100 increases, though the processing load of the communication apparatus on the second communication route R2 decreases. On the other hand, if the number of IP addresses stored in the routing table TBL is decreased, the processing load of the communication apparatus on the second communication route R2 increases, though the processing load of the communication control apparatus 100 decreases.

Therefore, the communication control apparatus 100 in the present embodiment further balances the processing load of the communication control apparatus 100 with the processing load of the communication apparatus on the second communication route R2, so as to suppress the deterioration of communication service quality provided to a client and suppress an increase of the processing load of the communication apparatus.

Then, the communication control apparatus 100 determines whether to store apparatus identification information into the TBL storage unit 108, based on communication information related to communication with the second apparatus (for example, the first server SVR1 or the like) with which the communication is performed and an information amount of the apparatus identification information for identifying the second apparatus which can be stored in the memory 12 (TBL storage unit 108). The communication information related to the communication with the second apparatus is also referred to as a communication history or a communication result.

Next, the storage processing of the above-mentioned communication information (hereafter appropriately described as communication result) will be described.

(Storage of Communication Result)

Figure 6:
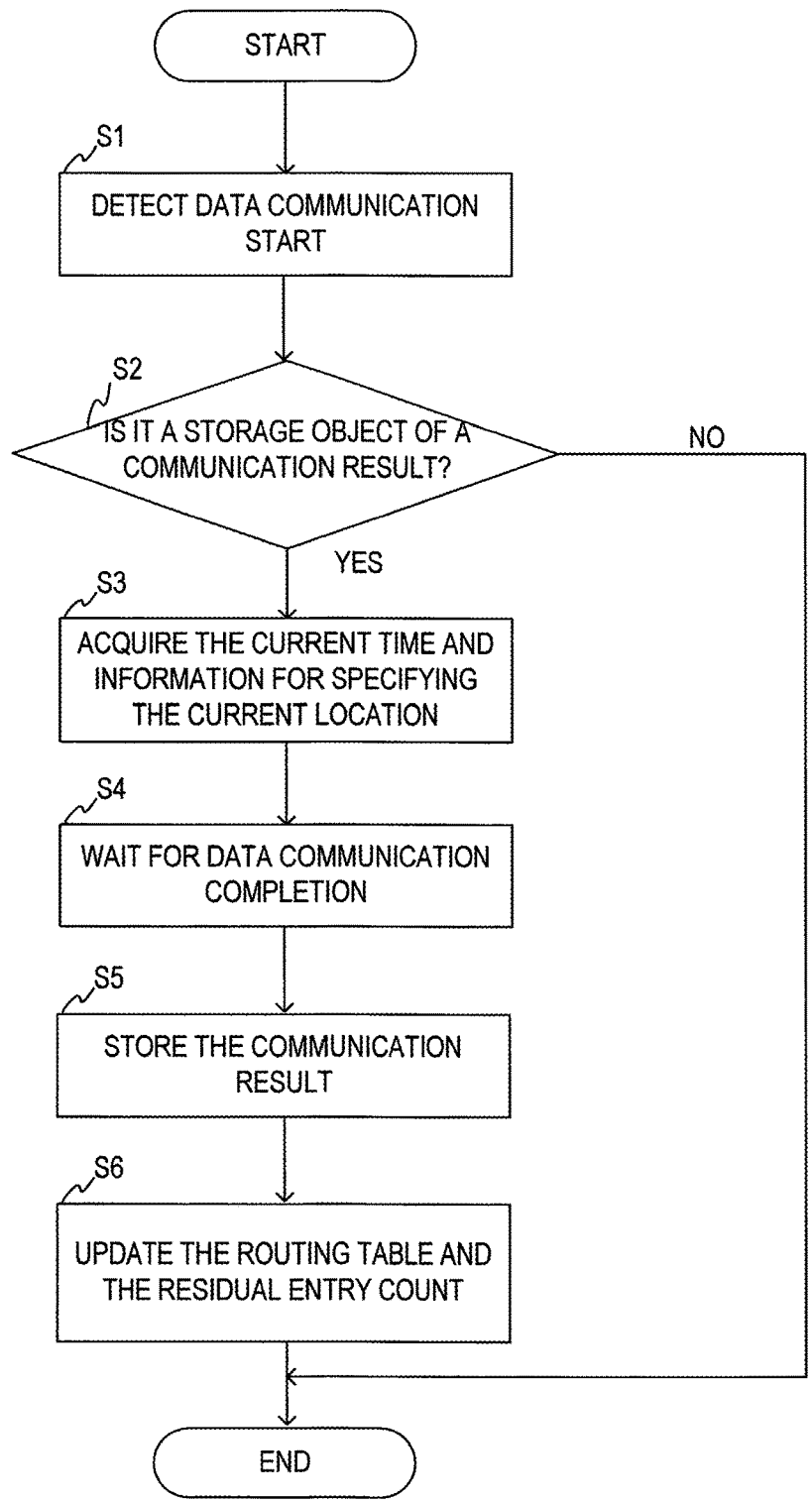
FIG. 6 is one example of a flowchart illustrating flow of a storage processing of a communication result.

FIG. 6 is one example of a flowchart illustrating the flow of the storage processing of a communication result.

Step S1: The communication monitoring unit 105 detects the start of data communication which the information processing apparatus PC executes.

Specifically, when three-way handshake is executed between the information processing apparatus PC and the communication opposite party (for example, the first server SVR1), the communication monitoring unit 105 detects the execution of the three-way handshake, to thereby detect the start of data communication which the information processing apparatus PC executes. Hereinafter, the data communication which the communication monitoring unit 105 detects in step S1 is described as data communication X.

Step S2: The communication monitoring unit 105 determines whether the data communication X is a storage object of communication result. Specifically, the communication monitoring unit 105 determines whether a communication packet destination IP address (hereafter appropriately described as a destination IP address) related to the data communication X is coincident with an IP address which will be described in step S30 of FIG. 12 (hereafter appropriately described a registration-completed IP address).

If the destination IP address is coincident with the registration-completed IP address (step S2/YES), the communication monitoring unit 105 determines that the data communication X is a storage object of communication result. The communication monitoring unit 105 then shifts to step S3. On the other hand, if the destination IP address is not coincident with the registration-completed IP address (step S2/NO), the communication monitoring unit 105 determines that the data communication X is not a storage object of communication result. The communication monitoring unit 105 then terminates the processing.

Step S3: The communication monitoring unit 105 acquires the current time and information for specifying the current location of the communication control apparatus 100. The current time is the start time of the data communication X which will be described in FIG. 9.

Specifically, the communication monitoring unit 105 acquires the current time from a time count function (not illustrated) in the communication control apparatus 100. Also, when the communication interface 14 is radio communicating with an access point through a wireless LAN, the communication monitoring unit 105 determines an identifier (SSID: Service Set Identifier) of the access point of concern to be information for specifying the current location. In addition, when the communication control apparatus 100 includes a function of acquiring longitude and latitude by means of GPS (Global Positioning System), the communication monitoring unit 105 determines position information, such as the longitude and the latitude acquired by use of the above function, to be information for specifying the current location.

Step S4: The communication monitoring unit 105 waits for the completion of the data communication X. Specifically, on completion of the data communication X, the communication monitoring unit 105 acquires the completion time thereof.

Step S5: The communication monitoring unit 105 stores the communication result into a communication result table. Here, a description on one example of the communication result table will be given in FIG. 9. One unit of communication results to be stored in the communication result table is appropriately described as a communication result record.

Step S6: The communication monitoring unit 105 performs update processing of the routing table TBL of FIG. 4 and a residual entry count accompanying the completion of the data communication X. Additionally, the details of the update processing will be described later.

(Aggregation of Communication Results)

Figure 7:
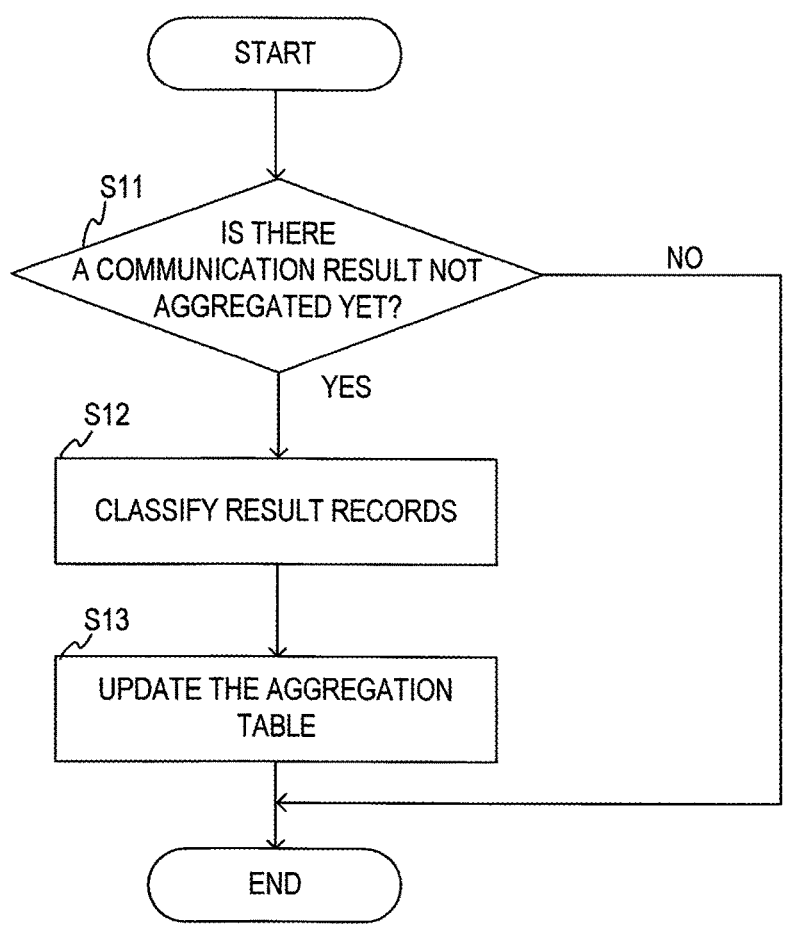
FIG. 7 is one example of a flowchart illustrating aggregation of a communication result.

The aggregation of communication results will be described by reference to FIGS. 7-10. FIG. 7 is one example of a flowchart illustrating the aggregation of communication results. The aggregation unit 106 aggregates communication results which the communication result table stores, on each predetermined time basis. The above predetermined time is, for example, 15 minutes.

Step S11: The aggregation unit 106 determines whether there is a communication result record not aggregated yet among the communication result records which the communication result table stores. Specifically, the aggregation unit 106 determines whether there is a communication result record to which an aggregation incompletion flag is set, among the communication result records which the communication result table stores.

If, among the communication result records which the communication result table stores, there is no communication result record not aggregated yet (step S11/NO), the aggregation unit 106 completes the aggregation of the communication results. If, among the communication result records which the communication result table stores, there is a communication result record not aggregated yet (step S11/YES), a shift is made to step S12.

Step S12: The aggregation unit 106 classifies communication result records not aggregated yet. In detail, the aggregation unit 106 reads out each communication result record to which aggregation incompletion flag is set, among the communication result records which the communication result table stores. Hereafter, a communication result record which is read out will appropriately be described as a readout-completed communication result record. Then, the aggregation unit 106 changes the aggregation incompletion flag, which is set to the readout-completed communication result record, into an aggregation completion flag. Next, the aggregation unit 106 classifies the communication result records according to the criteria of a communication opposite party, a segment indicative of a time range and the current location of the communication control apparatus 100. Additionally, the concrete processing of step S12 will be described later.

Step S13: The aggregation unit 106 aggregates each classified communication result record to convert into each aggregation record, and stores the converted aggregation record into the aggregation table. The concrete processing of step S13 will be described later.

(Classification of Communication Result Record)

A concrete description will be given on the classification of the communication result records in step S12 of FIG. 7. Each communication result record includes the start time of the data communication X, information for specifying the current location of the communication control apparatus 100, communication opposite party identification information for identifying the communication opposite party of the data communication X, and the completion time of the data communication X. Hereafter, the communication opposite party identification information for identifying the communication opposite party may appropriately be abbreviated simply as a communication opposite party.

Hereafter, the communication opposite party identification information for identifying the communication opposite party is described with FQDNm (a small letter m is an integer of 1 or greater), as an identifier. Also, the current location is described with SSIDm (a small letter m is an integer of 1 or greater). Further, when representing a time in the following description, an indication is given in the format of "H:M:S". The above "H" denotes hours, the "M" denotes minutes, and the "S" denotes seconds. Further, it is assumed that the year, month and day are also stored (no indication is given on the year, month and day).

First, the aggregation unit 106 classifies the readout-completed communication result records according to the criteria of each communication opposite party, each segment indicative of a time range, and each current location of the communication control apparatus 100 (which are hereafter appropriately described as classification criteria). The above each segment is each time range obtained by, for example, dividing one hour on a 15-minute basis, namely, 9:00-9:15, 9:15-9:30, . . . .

In the classification of the readout-completed communication result records, the aggregation unit 106 specifies each readout-completed communication result record in which a start time belongs to the same segment (which is also referred to as the same time range) and which includes the same communication opposite party and the same current location. Also, the aggregation unit 106 specifies the longest communication time among each specified readout-completed communication result record, and the shortest communication time among each specified readout-completed communication result record. The aggregation unit 106 then converts each specified readout-completed communication result record into an aggregation record.

For example, it is assumed that in the readout-completed communication result records X1, X2, a location included therein is "SSID1" and a communication opposite party is "FQDN1". Also, it is assumed that, in the readout-completed communication result record X1, a start time is "09:15:00" and a completion time is "09:55:00", and in the readout-completed communication result record X2, a start time is "09:20:00" and a completion time is "10:05:00".

In the above case, each start time of the readout-completed communication result records X1, X2 is included in the same segment (the time range of 09:15-09:30). Further, each location of the readout-completed communication result records X1, X2 is the same "SSID1", and each communication opposite party is the same "FQDN1". Then, the aggregation unit 106 specifies the readout-completed communication result records X1, X2, as readout-completed communication result records having each start time belonging to the same segment and including the same communication opposite party and the same current location. The aggregation unit 106 then converts the readout-completed communication result records X1, X2 into an aggregation record.

Items (also referred to as fields) included in the aggregation record are a first item to a fourth item. The aggregation record is described as, for example, {the first item, the second item, the third item, the fourth item}.

The first item is the communication opposite party in the readout-completed communication result record after the classification. The second item is the shortest communication time among the specified readout-completed communication result records (in other words, shortest communication time of communication with the communication opposite party). The third item is the longest communication time among the specified readout-completed communication result records (in other words, longest communication time of communication with the communication opposite party). Here, the communication time is a difference between a completion time and a start time included in one specified readout-completed communication result record. The fourth item is the maximum number of times of each communication unit (which is referred to as one session) performed by the communication control apparatus 100 which starts communication with the communication opposite party of the first item in the above-mentioned time range of the same segment and completes the communication of concern.

The aggregation unit 106 stores the aggregation record into an aggregation table in a manner to associate with each segment and each current location which are the classification criteria.

FIG. 8 is a diagram illustrating one example of the aggregation table which stores the aggregation record.

In an aggregation table TT1, the first column from the left in the figure is a segment column indicating a time range, a classification criterion. The second column from the left and after in the figure are location columns each indicating the location of the communication control apparatus 100, a classification criterion. In each part (which is also referred to as a cell) in which a segment column intersects with each location column, an aggregation record is stored as the aggregation result of each communication result.

Storage processing of the aggregation record in the aggregation table TT1 will be described by the exemplification of the readout-completed communication result records X1, X2. Hereafter, an aggregation record corresponding to the readout-completed communication result records X1, X2 after the classification is described as an aggregation record Y1.

In this case, the first item of the aggregation record Y1 is "FQDN1" which is the communication opposite party. Also, a communication time with the communication opposite party FQDN1 included in the communication result record X1 is "0:40:00" which is obtained from a difference between a completion time "09:55:00" and a start time "09:15:00". A communication time with the communication opposite party FQDN1 included in the communication result record X2 is "0:45:00" which is obtained from a difference between a completion time "10:05:00" and a start time "09:20:00". Namely, the shortest communication time among the specified readout-completed communication result records is "0:40:00", whereas the longest communication time among the specified readout-completed communication result records is "0:45:00". Accordingly, the second item of the aggregation record Y1 is "0:40:00", and the third item of the aggregation record Y1 is "0:45:00". Further, the maximum number of times of each communication unit in which the communication control apparatus 100 starts communication with the communication opposite party FQDN1 in the same segment of a time range 9:15-9:30 and completes the communication of concern, is 2. Therefore, the fourth item is 2 times.

From the above, the aggregation record Y1 is {FQDN1, 0:40:0, 0:45:0, 2 times}.

The aggregation unit 106, as depicted in the aggregation table TT1 of FIG. 8, stores the aggregation record Y1 in a cell at intersection between the segment column "09:15"-"09:30" and the location 1 (SSID1) which are the classification criteria for the communication result records X1, X2 corresponding to the aggregation record Y1.

Incidentally, in the aggregation table TT1 of FIG. 8, the aggregation unit 106 stores {FQDN2, 0:0:02, 0:0:2, 1 time} in the above-mentioned cell, as an aggregation record (hereinafter appropriately described as an aggregation record Y2).

On completion of the storage processing of the aggregation record for the aggregation table as described above, step S13 in FIG. 7 is completed.

In the above description, it is assumed that the aggregation unit 106 generates the aggregation table TT1 of FIG. 8 at 13:00:00 on Oct. 24, 2013. Also, it is assumed that the communication monitoring unit 105 executes each step of FIG. 6 and generates a communication result table TR1 of FIG. 9 at 12:00:00 on Oct. 25, 2013 which is the next day to Oct. 24, 2013. Further, it is assumed that the communication monitoring unit 105 starts step S11 of FIG. 7 at 13:00 on Oct. 25, 2013.

FIG. 9 is a diagram illustrating one example of a table for storing each communication result. By means of the processing described in FIG. 6, the communication monitoring unit 105 generates the communication result table TR1 of FIG. 9 to store into the storage unit 109. In FIG. 9, a communication result corresponding to one row of the communication result table TR1 is a communication result record. Here, the communication monitoring unit 105, when newly storing a communication result record into the communication result table TR1 of FIG. 9, stores into the storage unit 9 an aggregation incompletion flag corresponding to the newly stored communication result record.

The communication result table TR1 includes a start time column, a location column, a communication opposite party column and a completion time column.

The communication monitoring unit 105 stores: the start time of the data communication X into the start time column; information for specifying the current location of the communication control apparatus 100 into the location column; communication opposite party identification information for identifying the communication opposite parry of the data communication X into the communication opposite party column; and the completion time of the data communication X into the completion time column.

In FIG. 9, the communication monitoring unit 105 stores, in the first row of the communication result table TR1 for example, the start time "09:15:00" of the data communication X into the start time column; the current location "SSID1" of the communication control apparatus 100 into the location column; "FQDN1" into the communication opposite party column; and the completion time "10:15:00" of the data communication X into the completion time column.

In the communication result table TR1, each communication result record in the first to fourth rows is a communication result record of which aggregation is not completed.

Every location included in the communication result records in the first to the fourth rows is "SSID1", and every start time included in the communication result records of concern is included in the segment "09:15"-"09:30" in the aggregation table TT1 of FIG. 8.

Also, the communication opposite party included in the communication result record in the first row is "FQDN1". The communication time with the communication opposite party "FQDN1" is "01:00:00" which is obtained from a difference between the completion time "10:15:00" and the start time "09:15:00" included in the communication result record of the first row. Further, the communication result record including the above communication opposite party "FQDN1" is one record.

Now, the aggregation unit 106 updates the aggregation record Y1 described in FIG. 8 to obtain an aggregation record Y1.

FIG. 10 is a diagram illustrating a result after the aggregation table TT1 of FIG. 8 is updated. The aggregation record Y1' is, as depicted in the aggregation table TT2 of FIG. 10, {FQDN1, 0:40:0, 1:00:0, 3 times}.

The aggregation unit 106 updates, in the above update, "00:45:00" in the fourth item of the aggregation record Y1 before the update to "01:00:00". The reason is that, as depicted in the first row of the communication result table TR1 of FIG. 9, a communication time with the communication opposite party FQDN1 is 1 hour (10:15:00-09:15:00).

Also, each communication opposite party included in the communication result records in the second and third rows of the communication result table TR1 of FIG. 9 is "FQDN2". A difference between the completion time "09:16:05" and the start time "09:16:00" included in the communication result record in the second row is "00:00:05". A difference between the completion time "09:16:22" and the start time "09:16:20" included in the communication result record in the third row is "00:00:02". Accordingly, the shortest communication time between with the communication opposite party "FQDN2" is "00:00:02", whereas the longest communication time is "00:00:05".

Then, the aggregation unit 106 updates the aggregation record Y2, to thereby obtain an aggregation record Y2'. As depicted in the aggregation table TT2 of FIG. 10, the aggregation record Y2' is;

{FQDN2, 0:00:2, 0:00:5, 3 times}. Because the longest communication time in the aggregation record Y2' is 0:00:5, the aggregation unit 106 updates the third item of the aggregation record Y2 from 0:00:2 to 0:00:5. Further, the maximum number of times of each communication unit in which the communication control apparatus 100 starts communication with the communication opposite party FQDN2 in the same time range on one day and completes the communication of concern is 2 times. Therefore, the aggregation unit 106 updates the fourth item of the aggregation record Y2 from 1 time to 3 times.

Also, the communication opposite party included in the communication result record in the fourth row is "FQDN3". The communication time between with the communication opposite party "FQDN3" is "00:00:05" which is obtained from a difference between the completion time "09:17:05" and the start time "09:17:00" included in the communication result record in the fourth row.

The communication opposite party FQDN3 included in the communication result record in the fourth row is not included in the aggregation record stored in the cell in which the segment 9:15-9:30 column intersects with the location 1 (SSID1) column in FIG. 8.

Accordingly, the communication result record in the fourth row described in FIG. 9 is aggregated, so that an aggregation record Y3 is obtained. As depicted in the aggregation table TT2 of FIG. 10, the aggregation record Y3 is, {FQDN3, 0:00:5, 0:00:5, 1 time}.

Here, when there is one communication result record to be aggregated, one communication time is the longest communication time and the shortest communication time.

The aggregation table is updated by the update processing of the aggregation table as described in FIG. 7.

FIG. 11 is a diagram illustrating one example of the aggregation table which is updated by the update processing of the aggregation table described in FIG. 7.

An aggregation table TT3 is a table similar to the aggregation table TT1 in FIG. 8 and the aggregation table TT2 in FIG. 10. Here, for the convenience of description hereafter, the content of an aggregation record which the aggregation table TT3 stores is different from the aggregation record in FIG. 8 which the aggregation table TT1 stores and the aggregation record in FIG. 10 which the aggregation table TT2 stores.

The rows of the segment column store a segment T1 (9:00-9:15), a segment T2 (9:15-9:30), a segment T3 (9:30-

9:45) and a segment T4 (9:45-10:00), in order from the top to the bottom, as segments. A location column 0 to a location column 2 denote access point identifiers "SSID0"-"SSID2" with which the communication control apparatus 100 performs radio communication, in other words, information for specifying each current location.

In a cell which a segment column intersects with a location column, each aggregation record described in FIGS. 8, 10 is stored. For example, as denoted with a symbol V1, in a cell in which the segment T3 (9:30-9:45) intersects with the location 1;
{FQDN12, 0:35:0,
1:15:0, 3 times},
{FQDN2, 0:0:2, 0:0:7, 4 times},
{FQDN3, 0:0:3, 0:0:5, 4 times}
are stored.

The aggregation record described in FIG. 11 is one example of a communication result (also referred to as communication information) with regard to communication with the second apparatus with which the communication is performed.

(Storage Processing of Communication Result)

As described in FIGS. 6-11, the communication monitoring unit 105 of the communication control apparatus 100 stores into the storage unit 109 each communication result which includes the communication opposite party identification information for identifying the communication opposite party corresponding to the second apparatus and information for specifying the communication start time of communication with the communication opposite party. The information for specifying the communication start time of the communication with the communication opposite party is, for example, the communication start time as described in FIG. 9.

The aggregation unit 106 of the communication control apparatus 100 stores into the storage unit 109 each communication result which further includes each communication time and each number of communication times with the communication opposite party, as depicted in FIGS. 7-11. The above communication time with the communication opposite party is, for example, the longest communication time or the shortest communication time. The above number of communication times is the maximum number of times of each communication unit (which is referred to as one session) in which communication with the communication opposite party in the first item is started in the above-mentioned time range of the same segment and the communication thereof is completed.

(Outline of Communication Network Decision Processing)

Figure 12:
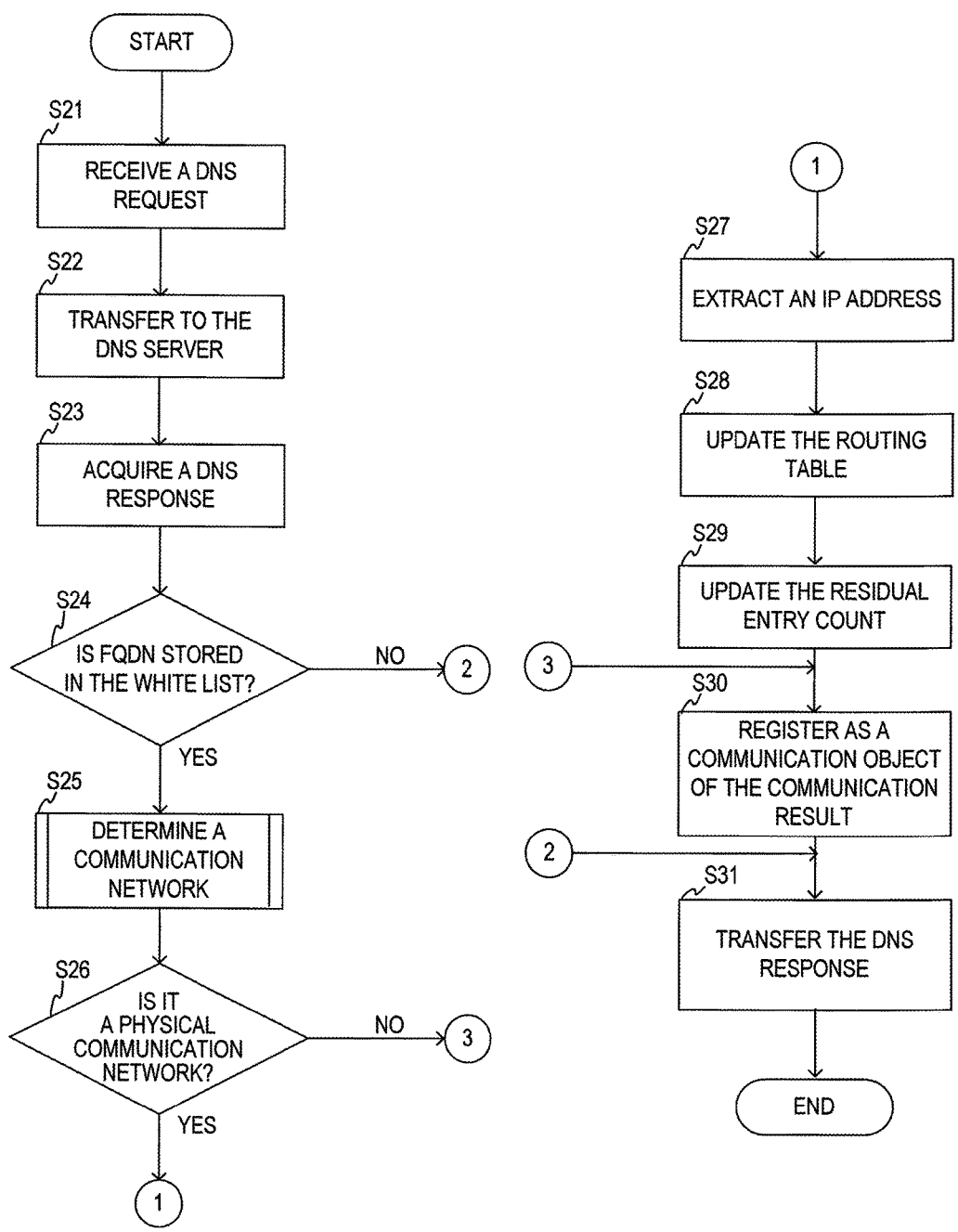
FIG. 12 is one example of a flowchart illustrating outline of a determination processing of a communication network which a communication control apparatus 100 executes.

The overall control unit 101 of the communication control apparatus 100 executes communication network decision processing. FIG. 12 is one example of a flowchart illustrating the outline of the decision processing of a communication network which the communication control apparatus 100 executes. Before the description of FIG. 12, the information processing apparatus PC conducts a DNS request to the communication control apparatus 100. The DNS request is a request for transmitting to the self-apparatus an IP address corresponding to a fully qualified domain name.

Step S21: A DNS processing unit 104 receives a DNS request from the information processing apparatus PC.

Step S22: The DNS processing unit 104 transfers the DNS request received in step S1 to the DNS server. The DNS processing unit 104 may also transfer, in the transfer of the DNS request, to the DNS server through the first communication route R1 and the Internet IN. Alternatively, it may also be possible for the DNS processing unit 104 to transfer to the DNS server through the second communication route R2 and the Internet IN.

The DNS server, on receiving the DNS request, transmits to the communication control apparatus 100 a DNS response including an IP address corresponding to the fully qualified domain name included in the received DNS request.

Step S23: The DNS processing unit 104 acquires the DNS response transmitted from the DNS server.

Step S24: The decision unit 111 determines whether communication opposite party identification information, included in the DNS request, for identifying a communication opposite party corresponding to the fully qualified domain name is stored in the white list WL1.

If the communication opposite party identification information, included in the DNS request, for identifying a communication opposite party corresponding to the fully qualified domain name is stored in the white list WL1 (step S24/YES), a shift is made to step S25.

Step S25: The decision unit 111 determines whether the communication route of a communication packet received from the communication control apparatus 100 is set to be a physical network or a VPN network. Here, the details of the decision processing of the communication network in step S25 will be described in the flowchart of FIG. 13.

Step S26: The execution unit 112 determines whether the communication network determined in step S25 is the physical network. If the communication network determined in step S25 is the physical network (step S26/YES), a shift is made to step S27.

Step S27: The execution unit 112 extracts an IP address from the DNS response which the DNS processing unit 104 acquires in step S23. The IP address is an IP address of the communication opposite party.

Step S28: The execution unit 112 updates the routing table TBL of FIG. 4. Concrete processing of step S28 will be described later.

Step S29: The execution unit 112 updates the residual entry count of the routing table TBL. Specifically, the execution unit 112 calculates the number of IP addresses which can newly be stored in the routing table TBL of FIG. 4, so as to determine the number of communication opposite parties after the calculation to be the residual entry count.

Step S30: The execution unit 112 registers the IP address extracted in step S27, as an identifier for identifying communication which is to be a collection object for the communication result. Specifically, the execution unit 112 stores into the storage unit 13 the IP address extracted in step S27, as registration-completed IP address (refer to step S2 in FIG. 6).

Step S31: The DNS processing unit 104 transfers the DNS response acquired in step S23 to the information processing apparatus PC.

Additionally, if the decision unit 111 determines that the communication opposite party identification information for identifying a communication opposite party, which corresponds to the fully qualified domain name included in the DNS request, is not stored in the white list WL1 (step S24/NO), a shift is made to step S31. If the communication network determined in step S25 is not the physical network (step S26/NO), a shift is made to step S30. By the processing of the above step S30, communication with a communication opposite party becomes a collection object for the communication result if the communication opposite party of interest happens to be a communication opposite party which is not stored (hereafter described as non-stored communication opposite party) in the routing table at the present time point. As a result, even the non-stored communication opposite party can be a communication opposite party to be stored in the routing table, dependent on the content of each subsequent communication result.

(Details of Communication Network Decision Processing)

Figure 13:
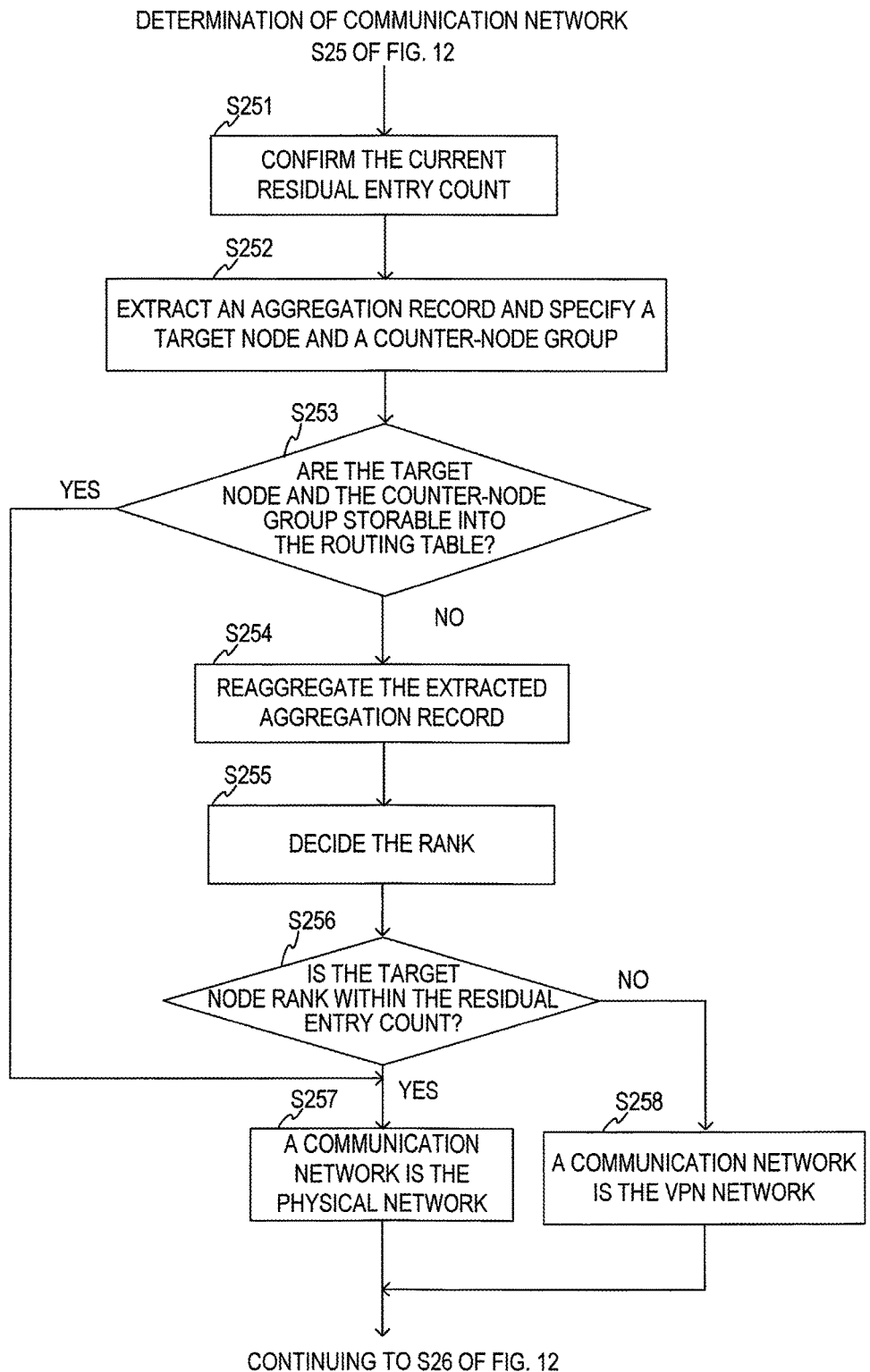
FIG. 13 is one example of a flowchart illustrating detail of a communication network determination processing which a communication control apparatus 100 executes.

FIG. 13 is one example of a flowchart illustrating the detail of the communication network decision processing which the communication control apparatus 100 executes. In other words, the flowchart of FIG. 13 is one example of a flowchart illustrating the processing of step S25 in FIG. 12 in detail.

Step S251: The decision unit 111 confirms the residual entry count of the routing table TBL of FIG. 4.

Here, the residual entry count is, in the routing table TBL, a difference between the total entry count and the number of IP addresses already stored in the routing table TBL. In the case of FIG. 4, the total entry count is 5, whereas one IP address (IP_13) is already stored in the routing table TBL. Accordingly, the decision unit 111 confirms that the residual entry count is 4 (5-1). Here, it may also be possible that the residual entry count is, in the routing table TBL, a number smaller than the difference between the total entry count and the number of IP addresses already stored in the routing table TBL. For example, when the total entry count is 20 and the number of IP addresses already stored in the routing table TBL is 2, the residual entry count may be a number smaller than 18.

Step S252: The aggregation data extraction unit 102 extracts from the aggregation table a record corresponding to the most recent range to the current time and the current location of the communication control apparatus 100, and the decision unit 111 specifies a target node and a counter-node group. Here, a node signifies a communication opposite party.

The target node is a communication opposite party specified by the fully qualified domain name included in the DNS request (refer to step S21 in FIG. 12) which the DNS processing unit 104 receives from the information processing apparatus PC. The target node denotes a communication opposite party to which communication is to be started.

The counter-node group is each communication opposite party obtained by excluding a communication opposite party corresponding to an apparatus, which is identified by apparatus identification information, stored in the routing table TBL of FIG. 4, and the target node, from each communication opposite party included in the extracted aggregation record. The above counter-node group denotes each communication opposite party which can be assumed, from the past communication results, to have a high possibility of being a communication opposite party at the times before and after the current time.

Step S253: The decision unit 111 determines whether it is possible to store the entire of the specified target node and the counter-node group into the routing table TBL of FIG. 4. When it is not possible to store the entire specified target node and the counter-node group into the routing table TBL of FIG. 4 (step S253/NO), a shift is made to step S254.

Step S254: The decision unit 111 reaggregates the aggregation record extracted in step S252. Specifically, when extracting a plurality of aggregation records, the decision unit 111 merges, for each of the same communication opposite party, the longest communication times of communication with the communication opposite party of concern, and further, merges the shortest communication times of communication with the communication opposite party of concern, to thereby generate an aggregation record. Then, the decision unit 111 sums up the number of times included in the aggregation records to be merged. Details will be described in FIG. 14.

Step S255: The decision unit 111 determines the rank of communication opposite parties, included in the aggregation record obtained by reaggregation in step S254, based on an evaluation function. The evaluation function will be described in FIG. 15.

Step S256: The decision unit 111 determines whether the rank of the target node is within the residual entry count confirmed in step S251.

If the rank of the target node is within the residual entry count confirmed in step S251 (step S256/YES), a shift is made to step S257. If the rank of the target node is not within the residual entry count confirmed in step S251 (step S256/NO), a shift is made to step S258.

Step S257: The decision unit 111 decides (which may also be called as determines) that the communication network is the physical network.

Step S258: The decision unit 111 decides that the communication network is the VPN network.

Further, when all of the specified target node and the counter-node group can be stored in the routing table TBL of FIG. 4 (step S254/YES), a shift is made to step S257.

When the decision unit 111 determines the communication network to be the physical network (step S257), YES is determined in step S26 of FIG. 12, and in step S28, the apparatus identification information of an apparatus corresponding to the target node is stored in the routing table TBL of FIG. 4.

The processing of steps S253 and S256 of FIG. 13 are concrete examples of processing for deciding whether to store the apparatus identification information of the second apparatus starting communication into the TBL storage unit 108, based on communication information related to communication with the second apparatus with which the communication is performed, and an information amount of apparatus identification information, which can be stored in the TBL storage unit 108, for identifying the second apparatus.

(Concrete Example of Communication Network Decision Processing)

A concrete example of the communication network decision processing will be described. Here, it is assumed that the total entry count of the routing table TBL of FIG. 4 is 5, and an IP address stored in the routing table TBL is IP_13. In this case, the residual entry count, namely, a difference between the total entry count and the number of IP addresses stored in the routing table TBL is 4.

First, the DNS processing unit 104, on receiving the DNS request from the information processing apparatus PC (step S21 in FIG. 12), successively executes steps S22, S23. Here, a communication opposite party specified by the fully qualified domain name included in the DNS request, in other words a target node is assumed to be FQDN3. The decision unit 111 determines whether the communication opposite party specified by the fully qualified domain name included in the DNS request is already stored in the white list WL1 of FIG. 3 (step S24). The communication opposite party FQDN3 (target node FQDN3) is stored in the white list WL1. Therefore, the decision unit 111 determines YES in step S24, and decides a communication network (step S25).

The decision unit 111 confirms that the residual entry count of the routing table TBL of FIG. 4 is the above exemplified 4 (step S251 in FIG. 13).

(Extraction of Aggregation Record in Communication Network Decision Processing)

The aggregation data extraction unit 102 extracts, from the aggregation table TT3 of FIG. 11, an aggregation record corresponding to the most recent range to the current time and the current location of the communication control apparatus 100. Then, the decision unit 111 specifies a target node and a counter-node group (step S252). Specifically, the aggregation data extraction unit 102 extracts from the aggregation table TT3 an aggregation record stored in a cell in which the current location of the communication control apparatus 100 intersects with a segment including the current time.

Further, the aggregation data extraction unit 102 extracts from the aggregation table TT3 aggregation records stored in two cells in which the current location of the communication control apparatus 100 intersects with segments temporally before and after a segment including the current time. The above segments temporally before and after are segments immediately before and after the segment of concern.

For example, in the aggregation table TT3 of FIG. 11, when letting the segment including the current time be a segment T3, a segment temporally before the segment T3 is a segment T2, whereas a segment temporally after the segment T3 is a segment T4.

Here, it is assumed that the current location of the communication control apparatus 100 is a location 1 (SSID1) and the current time is 9:35. In this case, the aggregation data extraction unit 102 extracts, from the aggregation table TT3 of FIG. 11, each aggregation record (refer to a frame of a dotted line as depicted with a symbol V1 in FIG. 11) stored in a cell in which the location 1 (SSID1) intersects with the segment T3 including the current time (9:35).

Further, the decision unit 111 extracts an aggregation record (refer to a frame of a dotted line as depicted with a symbol V2 in FIG. 11) stored in a cell in which the location 1 (SSID1) intersects with the segment T2 which is temporally before the segment T3 including the current time (9:35). Then, the decision unit 111 extracts an aggregation record (refer to a frame of a dotted line as depicted with a symbol V3 in FIG. 11) stored in a cell in which the location 1 (SSID1) intersects with the segment T4 which is temporally after the segment T3 including the current time (9:35).

(Specification of Node in Communication Network Decision Processing)

The decision unit 111 specifies a target node and a counter-node group from the plurality of aggregation records which the aggregation data extraction unit 102 extracts. Here, the decision unit 111 specifies a communication opposite party FQDN3 as a target node, and specifies four nodes of communication opposite parties, FQDN1, FQDN2, FQDN4 and FQDN12, as a target node group. Additionally, apparatus identification information for identifying an apparatus corresponding to the communication opposite party FQDN13 is already stored in the routing table TBL of FIG. 4. Therefore, the decision unit 111 does not specify the communication opposite party FQDN13 as a counter-node group.

The decision unit 111 determines whether it is possible to store the entire of the specified target node and the counter-node group into the routing table TBL of FIG. 4 (step S253).

Here, specifically, the decision unit 111 determines whether the residual entry count of the routing table TBL is smaller than and including the sum of the total of the number of nodes of each target node and the number of nodes of the counter-node group. In the case of the above-mentioned example, the residual entry count is 4, the number of nodes of the target nodes is 1 and the number of nodes of the count-node group is 4. Therefore, the decision unit 111 determines that the residual entry count (4) is not smaller than, including the sum (5) of the number of nodes of the target nodes (1) and the number of nodes of the counter-node group (4) (step S253/NO).

Additionally, as described in step S251 of FIG. 13, it may also be possible to set the residual entry count of the routing table TBL to be a number smaller than a difference between the total entry count and the number of communication opposite parties already stored in the routing table TBL. In the above example, the residual entry count may be set to be 3, for example.

(Reaggregation of Aggregation Records in Communication Network Decision Processing)

The decision unit 111 reaggregates the extracted aggregation records (step S254). Specifically, the decision unit 111 specifies a plurality of aggregation records which includes the same communication opposite party. The above plurality of aggregation records are the above extracted aggregation records. Then, the decision unit 111 specifies the longest time among each longest communication time and the shortest time among each shortest communication time, among the plurality of specified aggregation records.

Then, the decision unit 111 sums up the number of times included in the specified aggregation records. Namely, the first item of each aggregation record after merging is the same communication opposite party, and the second item is the shortest time among each specified shortest communication time. Also, the third item of the aggregation record after merging is the longest time among each specified longest communication time, and the fourth item is the above-mentioned total number of times. The decision unit 111 executes merge processing for merging the plurality of aggregation records, which include the same communication opposite party, into one aggregation record, so as to perform rank decision processing which will be described later.

Figure 14:
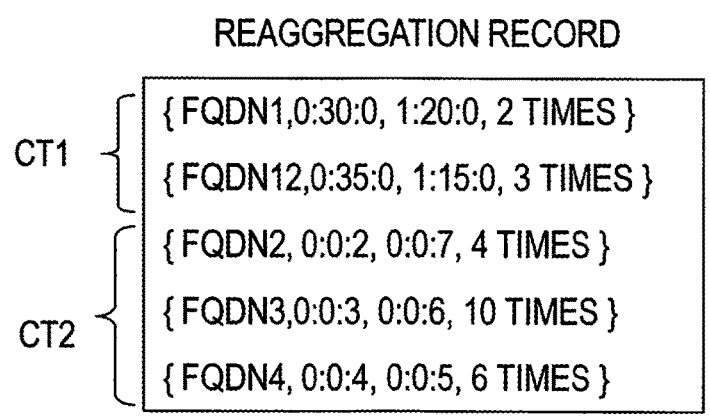
FIG. 14 is a diagram illustrating one example of a reaggregation record.

FIG. 14 is a diagram illustrating one example of the reaggregation record. FIG. 14 illustrates 5 reaggregation records.

When merging the extracted communication records described in FIG. 11, namely,
{FQDN3, 0:0:3,
0:0:5, 4 times} and
{FQDN3, 0:0:4,
0:0:6, 6 times},
the result is,
{FQDN3, 0:0:3,
0:0:6, 10 times}.
Also, when merging the extracted communication records described in FIG. 11, namely,
{FQDN4, 0:0:4,
0:0:5, 4 times} and
{FQDN4, 0:0:5,
0:0:5, 2 times},
the result is
{FQDN4, 0:0:4,
0:0:5, 6 times}.

Here, as a generic name of each aggregation record after the merging and each aggregation record without merging among the extracted aggregation records, a description is appropriately given as a reaggregation record. Here, it is assumed that the reaggregation record does not include each aggregation record which includes a communication opposite parry corresponding to the apparatus identified by the apparatus identification information stored in the routing table TBL of FIG. 4.

(Evaluation Function in Communication Network Decision Processing)

The decision unit 111 determines the rank of each communication opposite party included in the reaggregation record based on an evaluation function (step S255). Then, the decision unit 111 determines a communication network based on the rank of the target node among the above each ranked communication opposite party, and the residual entry count of the routing table TBL of FIG. 4.

One example of the evaluation function will be described. The evaluation function is a function for ranking each communication opposite party in such a manner that the rank of a communication opposite party having a larger amount of communication comes to an upper place. Here, a large amount of communication signifies a long communication time and/or a large number of communication times.

The communication time and the number of communication times differ greatly among the categories of communication contents, and the tendency thereof also differs. Therefore, the evaluation function classifies communication opposite parties into two by a communication time. Then, the evaluation function determines each rank of a plurality of communication opposite parties classified in the first, and subsequently determines each rank of a plurality of communication opposite parties classified in the second.

FIG. 15 is a diagram illustrating the communication time, the number of communication times and the tendency of the communication contents based on each category. In FIG. 15, there are denoted a category column, a communication time (one session) column, a number of communication times (one day) column and a tendency column.

The category column denotes the category of the communication contents. The category includes a first and a second category. As the first category, there are communication contents including a conference system such as video conference and a streaming system such as video viewing. As the second category, there are communication contents including a search system for performing a search request to a search server and a browsing system.

In the conference system and the streaming system, it is possible to empirically obtain tendencies with respect to the communication time and the number of communication times, as described below. For example, a communication time in the communication of one session may be a several tens of seconds in the case of being short, whereas several hours or more in the case of being long. Also, the number of communication times is relatively small, namely, from once to several times a day.

On the other hand, in the search system and the browsing system, it is possible to empirically obtain tendencies with respect to the communication time and the number of communication times, as described below. For example, a communication time in the communication of one session is around several seconds. Also, the number of communication times is several times a day (the number of communication times is low) dependent on a communication opposite party, and hundred times a day (the number of communication times is high), dependent on each communication opposite party.

As having been described above, as to the tendency of the conference system and the streaming system, there is a large communication time difference in the communication time (from several hours to several tens of seconds in the case of being long). Also, a difference in the number of communication times is small, in comparison with a difference in the number of communication times in the search system and the browsing system. On the other hand, as to the tendency of the search system and the browsing system, there is a small difference in the communication time. Further, a difference in the number of communication times is large in comparison with a difference in the number of communication times in the conference system and the streaming system.

(Ranking in Communication Network Decision Processing)

The evaluation function classifies each reaggregation record which includes, for example, the shortest communication time longer than and including a predetermined time, into the first category. Next, the evaluation function classifies a reaggregation record which includes, for example, the shortest communication time shorter than the predetermined time, into the second category. The above predetermined time is 1 minute, for example.

Then, the decision unit 111 ranks each reaggregation record belonging to the first category based on the evaluation function, in such a manner that a communication opposite party having a longer communication time is ranked at a higher place. Next, subsequent to the above ranking, the decision unit 111 ranks each reaggregation record belonging to the second category based on the evaluation function, in such a manner that a communication opposite party having a larger number of communication times is ranked at a higher place.

According to the evaluation function, it is possible to flexibly adjust ranking in comparison with the ranking of each communication opposite party based on, for example, only the communication time, only the number of communication times or only the total communication time obtained by simply multiplying the communication time by the number of communication times, to thereby optimally perform ranking according to the communication time and the number of communication times.

In the example of FIG. 14, each shortest communication time in two reaggregation records denoted with a symbol CT1 is 1 minute or longer, and accordingly, the two reaggregation records denoted with the symbol CT1 belong to the first category. On the other hand, each shortest communication time in three reaggregation records denoted with a symbol CT2 is shorter than 1 minute, and accordingly, the three reaggregation records denoted with the symbol CT2 belong to the second category.

FIG. 16 is one example of a table illustrating the result of ranking five reaggregation records of FIG. 14, executed by the decision unit 111 based on the evaluation function. A ranking table TO1 includes a ranking column and a communication opposite party column.

In FIG. 16, the communication opposite party column of the reaggregation record is stored in the communication opposite party column.

In FIG. 16, there is a communication opposite parry corresponding to an apparatus, which is identified by apparatus identification information stored in the routing table TBL of FIG. 4, in the uppermost row. Further, in the ranking column corresponding to the communication opposite party of concern, "(already stored)" is stored.

Further, in the case of a reaggregation record including the communication opposite party FQDN1, the ranking table TO1 stores FQDN12 in the second row as a communication opposite party, in an associative manner with each column.

Ranking by means of the evaluation function will be described specifically. First, the decision unit 111 ranks each communication opposite party of two reaggregation records belonging to the first category based on the evaluation function, in such a manner that a communication opposite party having a longer communication time is ranked at a higher place.

As depicted in FIG. 14, with regard to the communication opposite party FQDN12, the shortest time is 0:35:0 and the longest time is 1:15:0. Also, the communication of the communication opposite party FQDN12 is executed for three times. On the other hand, with regard to the communication opposite party FQDN1, the shortest time is 0:30:0, and the longest time is 1:20:0. Also, the communication of the communication opposite party FQDN1 is executed twice. Therefore, the communication time of the communication opposite party FQDN12 is longer than the communication time of the communication opposite party FQDN1. Therefore, the communication opposite party FQDN12 is ranked at the first place and the communication opposite party FQDN1 is ranked at the second place.

Next, with regard to three reaggregation records belonging to the second category, the decision unit 111 ranks each communication opposite party of the three reaggregation records belonging to the second category based on the evaluation function, in such a manner that a communication opposite party having a larger number of communication times is ranked at a higher place.

As depicted in FIG. 14, with regard to the communication opposite party FQDN3, the shortest time is 0:0:3 and the longest time is 0:0:6. Also, the communication of the communication opposite party FQDN3 is executed for ten times.

Further, with regard to the communication opposite party FQDN4, the shortest time is 0:0:5 and the longest time is 0:0:5. Also, the communication of the communication opposite party FQDN4 is executed for six times.

Further, with regard to the communication opposite party FQDN2, the shortest time is 0:0:2 and the longest time is 0:0:7. Also, the communication of the communication opposite party FQDN2 is executed for four times.

Therefore, subsequent to the ranking of the communication opposite parties included in the two reaggregation records belonging to the first category, the communication opposite party FQDN3 is ranked at the third place, the communication opposite party FQDN4 is ranked at the fourth place, and the communication opposite party FQDN2 is ranked at the fifth place.

(Decision of Communication Network)

Next, the decision unit 111 determines whether the rank of the target node is within the residual entry count confirmed in step S251 (step S256). Here, the residual entry count of the routing table TBL of FIG. 4 is assumed to be 4. Also, the target node is assumed to be FQDN3. According to the ranking table TO1 of FIG. 16, the rank of the target node FQDN3 is the third place. Therefore, the rank (3) of the target node FQDN3 is within the residual entry count (4) (step S256/YES), and the decision unit 111 decides the communication network to be the physical network. Hereinafter, the above decision is appropriately described as a physical network decision.

On the other hand, when the target node is FQDN2, the rank of the target node FQDN2 is 5, according to the ranking table TO1 of FIG. 16. Therefore, the decision unit 111 determines that the rank (5) of the target node FQDN2 is not within the residual entry count (4) (step S256/NO), and decides the communication network to be the VPN network (step S258). Hereinafter, the above decision is appropriately described as a VPN network decision.

Additionally, when the residual entry count is 6, and when the decision unit 111 specifies the communication opposite party FQDN3 to be a target node, and also specifies four nodes FQDN1, FQDN2, FQDN4 and FQDN12 to be a counter-node group as described earlier, a determination is made in step S253 of FIG. 13 as follows.

Namely, the residual entry count is 6, the number of nodes of the target node is 1 and the number of nodes of the counter-node group is 4. Therefore, the decision unit 111 determines that the residual entry count (6) of the routing table TBL is smaller than and including the sum (5) of the number of nodes (1) of the target node and the number of nodes (4) of the counter-node group (step S253/YES), so as to decide that a communication network is the physical network, without executing the processing of steps S254-S256 (step S257). As such, because of the non-execution of steps S254-S256, the processing load of the communication control apparatus 100 can be reduced. Also, the communication network decision processing is quickened.

(After the Completion of Communication Network Decision Processing)

By reference to FIGS. 4, 6 and 12, a description will be given on processing after the completion of the communication network decision processing. As described above, the processing of step S25 of FIG. 12 (in other words, steps S251-S258 of FIG. 13), that is, the communication network decision processing is completed.

The execution unit 112 determines whether the communication network determined in step S25 is the physical network. Hereinafter, a description will be given by the exemplification of a case when the decision unit 111 performs the physical network decision. The execution unit 112 executes processing of steps S27, S28 of FIG. 12. The execution unit 112 stores into the routing table TBL of FIG. 4 apparatus identification information for identifying an apparatus corresponding to the FQDN3 (communication opposite party FQDN3) which is the target node (step S28). Then the execution unit 112 updates the residual entry count of the routing table TBL, to set the residual entry count to be 3. The reason for the residual entry count of 3 is that, because the total entry count of the routing table TBL is 5 and the number of IP addresses already stored in the routing table TBL is 2, the residual entry count comes to 3 (5-2). Thereafter, the processing of steps S30, S31 is executed.

Now, by the start of communication with the communication opposite party FQDN3, the processing of steps S1-S3 described in FIG. 6 is executed. Here, because the IP address of the communication opposite party FQDN3 is a registration-completed IP address, the communication monitoring unit 105 determines that the data communication of the communication opposite party FQDN3 is a storage object of a communication result (step S2/YES), so as to execute the processing of step S3. Then, the communication monitoring unit 105 waits for the completion of the data communication of the communication opposite party FQDN (step S4), and on completion of the data communication of concern, stores the communication result into the communication result table TR1 of FIG. 9.

Then, due to the completion of the communication with the communication opposite party FQDN3, the communication monitoring unit 105 performs update processing of the routing table TBL of FIG. 4 and the residual entry count (step S6). In the above-mentioned example, the communication monitoring unit 105 performs the processing of deleting apparatus identification information (IP_3) stored in the routing table TBL of FIG. 4, and reducing the residual entry count by one.

Incidentally, in the transfer processing of a communication packet, an IP stack unit 107 acquires an IP address indicative of the destination of the communication packet received from the information processing apparatus PC. When the above IP address is stored in the communication opposite party column of the routing table TBL of FIG. 4, the IP stack unit 107 transfers the communication packet through the physical network to the communication opposite parry. On the other hand, when the IP address is not stored in the communication opposite party column of the routing table TBL, the IP stack unit 107 transfers the communication packet through the VPN network to the communication opposite party.

As having been described, the decision unit 111 determines whether to store, into the TBL storage unit 108, the apparatus identification information of the second apparatus starting communication, based on the communication result, including a communication start time belonging to a predetermined time range corresponding to the current time among each communication result of the communication opposite party, and the information amount of the apparatus identification information which can be stored in the TBL storage unit 108.

Here, the predetermined time range corresponding to the current time among each communication result of the communication opposite party is, when the current time is 9:35, each time range denoted with each segment T1, T2, T3. Also, each communication result including the communication start time belonging to the predetermined time range is each record denoted with each symbol CT1, CT2 in the examples of FIGS. 11, 14. Also, the information amount of the apparatus identification information which can be stored is the number of apparatus identifiers (for example, IP addresses) of each second apparatus which can be stored in the TBL storage unit 108. In the example of FIG. 4, the number of identifiers of each second apparatus which can be stored in the TBL storage unit 108 is the residual entry count of the routing table TBL.

Specifically, the decision unit 111 performs processing as described below. The decision unit 111 ranks a specific communication opposite party and a communication opposite party starting communication, based on the communication time and the number of communication times with the specific communication opposite party, specified by the communication opposite party identification information included in the communication result which includes the communication start time belonging to the predetermined time range corresponding to the current time, among each communication result of the communication opposite party.

The above specific communication opposite party is, when the current time is 9:35 in the examples of FIGS. 11, 13, each communication opposite party FQDN1, FQDN2, FQDN3, FQDN4 and FQDN12, excluding the communication opposite party FQDN13 corresponding to the apparatus identified by the apparatus identification information stored in the routing table TBL of FIG. 4. Further, with regard to the communication time of the communication opposite party and the number of communication times, in the case of the communication opposite party FQDN1 in the example of FIG. 13, the communication time is "0:30:0" or "1:15:0" and the number of communication times is 2 times.

Then, the decision unit 111, after performing the above-mentioned ranking, determines whether to store, into the TBL storage unit 108, the apparatus identification information of the second apparatus starting communication, based on the rank value of the communication opposite party starting communication and the information amount of the apparatus identification information which can be stored in the TBL storage unit 108. Here, one set of apparatus identification information is an identifier (for example, IP address) of one second apparatus. Also, the information amount of the apparatus identification information which can be stored in the TBL storage unit 108 is the number of identifiers which can be stored in the TBL storage unit 108. The number of identifiers which can be stored in the TBL storage unit 108 is, for example, the residual entry count of the routing table TBL of FIG. 4.

The decision unit 111 performs the above-mentioned ranking, using the evaluation function described in FIG. 15.

Specifically, in the above-mentioned ranking, the decision unit 111 ranks each communication opposite party which is included in each communication result including the communication time of a predetermined time or longer among the communication results of the specific communication opposite party, based on a first ranking criterion. Also, the decision unit 111 ranks each communication opposite party which is included in each communication result including the communication time shorter than a predetermined time among the communication results of the specific communication opposite party, based on a second ranking criterion different from the first ranking criterion.

Here, the first ranking criterion is a criterion for ranking in order from the longest communication time to the shortest with respect to each communication opposite party which is included in each communication result including the communication time of the predetermined time or longer, among the communication results of the specific communication opposite party.

The communication time of the predetermined time or longer is the shortest communication time in the examples of FIGS. 14, 16, in which the predetermined time is, for example, one minute. In the example of FIG. 16, the communication opposite party FQDN12 is ranked at the first place, and the communication opposite party FQDN1 is ranked at the second place.

Also, the second ranking criterion is a criterion for ranking in order from the largest number of communication times to the smallest, subsequent to the ranking based on the first ranking criterion, with respect to each communication opposite party which is included in each communication result including the communication time shorter than the predetermined time, among the communication results of the specific communication opposite party. In the example of FIG. 16, subsequent to the above-mentioned ranking (following the second place), the communication opposite party FQDN3 is ranked at the third place, the communication opposite party FQDN4 is ranked at the fourth place, and the communication opposite party FQDN2 is ranked at the fifth place.

When the rank value of a communication opposite party starting communication is smaller than and including the number of identifiers of the second apparatuses which can be stored in the TBL storage unit 108 (step S256/YES in FIG. 13 and step S26/YES in FIG. 12), the decision unit 111 stores the identifier of the second apparatus starting communication into the TBL storage unit 108 (step S28 in FIG. 12).

Also, when the sum of the number of specific communication opposite parties and the number of communication opposite parties starting communication is smaller than and including the number of identifiers of the second apparatuses which can be stored in the TBL storage unit 108 (step S256/YES in FIG. 13 and step S26/YES in FIG. 12), the decision unit 111 stores the identifier of the second apparatus starting communication into the TBL storage unit 108 (step S28 in FIG. 12).

According to the communication control apparatus in the present embodiment, the IP address of an apparatus corresponding to a counter-node, having the possibility of an elongated communication time and/or an increased number of communication times, is preferentially stored in the routing table TBL.

According to such a communication control apparatus, the IP address of an apparatus corresponding to a target node, having the possibility of an elongated communication time and/or an increased number of communication times, is easily stored into the routing table TBL. Therefore, the communication control apparatus does not use the VPN network when communicating with the target node of concern. As a result, it is possible to reduce the processing load of a communication apparatus on the second communication route R2 forming the VPN network.

Meanwhile, according to such a communication control apparatus, the IP address of an apparatus corresponding to a target node having the possibility of a shortened communication time and/or a reduced number of communication times is hard to be stored into the routing table TBL. Therefore, the communication control apparatus uses the VPN network when communicating with the target node of concern. As such, because communication with the target node having the possibility of a shortened communication time and/or a reduced number of communication times has a reduced communication amount, the processing load of a communication apparatus on the second communication route R2 forming the VPN network does not increase.

Thus, such a communication control apparatus strictly selects and stores, into the routing table, the IP address of an apparatus corresponding to the target node based on the past communication results and the residual entry count. As a result, it is possible to suppress an increase of the processing load which is produced by the confirmation processing and the collation processing of the communication control apparatus according to the present embodiment.

Further, if the residual entry count of the routing table TBL of FIG. 4 is large, the IP address of the apparatus corresponding to the target node is easily stored into the routing table TBL. In other words, this causes a loose degree of selection strictness when storing the IP address of the apparatus corresponding to the target node.

As such, in the communication control apparatus according to the present embodiment, the largeness of the residual entry count is a state of a low processing load for the collation processing and the confirmation processing in the communication control apparatus, because the number of IP addresses stored in the routing table TBL is small. In the above state of the low processing load state of the collation processing and the confirmation processing, the processing load of the collation processing and the confirmation processing in the communication control apparatus does not become excessive if the IP address of the apparatus corresponding to the target node is stored into the routing table TBL.

Also, if the residual entry count of the routing table TBL of FIG. 4 is small, the storage of the IP address of the apparatus corresponding to the target node into the routing table TBL becomes hard. In other words, this causes a severe degree of selection strictness when storing the identifier of the target node.

As such, in the communication control apparatus according to the present embodiment, the smallness of the residual entry count is a state of a high processing load for the collation processing and the confirmation processing in the communication control apparatus, because the number of IP addresses stored in the routing table TBL is large. In the above state of the high processing load state of the collation processing and the confirmation processing, an increase of the processing load of the collation processing and the confirmation processing in the communication control apparatus is suppressed because the IP address of the apparatus corresponding to the target node is not stored into the routing table TBL.

As having been described, according to the present embodiment, it is possible to balance the processing load of the communication control apparatus 100 with the processing load of the communication apparatus on the second communication route R2.

Moreover, in the existing communication system of FIG. 1, including the first communication route R1, the second communication route R2, the Internet IN and the first server SVR1 to the n-th server SVRn, the above balancing can be achieved if the communication control apparatus according to the present embodiment is applied. Accordingly, it is not needed to modify the existing communication system in order to achieve the above balance.

Incidentally, in the aggregation table described in FIGS. 8-11, the reason for providing the location column and the classification of the aggregation records location-by-location is as follows. Namely, when the communication control apparatus 100 is transportable (also called as portable), the communication opposite party may be changed dependent on the current location.

For example, when the current location is in the vicinity of a cooperation to which the user of the communication control apparatus 100 belongs, a communication opposite party may often be a server which provides information related to a job. On the other hand, when the current location is in the vicinity of the home of the user of the communication control apparatus 100, a communication opposite party may often be a server which provides information related to the private interest of the user.

As such, because the communication opposite party varies dependent on the current location, the location column is provided in the aggregation table described in FIGS. 8-11 in order to extract a counter-node group optimal for the current location, and the aggregation records are classified location-by-location.

Also, as having been described in FIG. 11, the aggregation data extraction unit 102 extracts, from the aggregation table TT3 of FIG. 11, the aggregation records stored in the two cells in which the current location of the communication control apparatus 100 intersects with the segments temporally before and after the segment which includes the current time. As such, by the extraction of the aggregation records stored in the two cells of the segments before and after, it is possible to extract a larger number of counter-node groups to be used as criteria for rank decision. For example, when only an aggregation record stored in one cell in which the current location of the communication control apparatus 100 intersects with a segment including the current time, it is not possible to extract a sufficient number of counter-nodes to be used as criteria for rank decision. As a result, the accuracy of ranking the counter-node groups and the target node is deteriorated. However, if a larger number of counter-node groups to be used as criteria for rank decision can be extracted, the accuracy of ranking the counter-node groups and the target node is improved.

Therefore, in order to improve the accuracy of ranking the counter-node group and the target node, it may be possible to apply N segments before (N is an integer of 2 or greater) and N segments after the segment which includes the current time, not only temporally one segment before and one segment after. As a result, it becomes possible to extract more counter-node groups to be used as a criterion for rank decision.

Incidentally, when the target node is not included in any aggregation record extracted from the cells, the decision unit 111 may determine a communication network to be the physical network, or a communication network to be the VPN network.

Second Embodiment

In the first embodiment, the communication control apparatus 100 generates the aggregation record in each the communication opposite party. However, the volume of aggregation records increases when the communication control apparatus 100 generates, for a multiplicity of communication opposite parties, the aggregation record in each communication opposite party. Further, in the aggregation record extraction processing (refer to step S252 of FIG. 13), the number of extracted aggregation records becomes large, causing an increase of the processing load in the rank decision processing (step S255) and a delay in the decision processing of communication network. In order to prevent such a delay, the communication control apparatus 100 sets a category for decision simplification, to each communication opposite party. Then, the communication control apparatus 100 generates the aggregation record in each the category.

(Category)

FIG. 17 is a diagram illustrating one example of a white list in the second embodiment.

A white list WL2 includes a communication opposite party column and a category column. The communication opposite party column stores communication opposite party identification information for identifying a reliable communication opposite party. The category column stores information (which is also referred to as identifier) for identifying the category of the communication opposite party which is set corresponding to the communication opposite party identification information for identifying a communication opposite party. Symbols C1-C3 stored in the category column of FIG. 17 are category identifiers for identifying the categories of communication opposite parties.

Here, each communication opposite party FQDN1, FQDN12, FQDN13 is assumed to be a server having a high possibility of executing communication for one minute or longer, for example, a video distribution server etc. Then, in the example of FIG. 17, a category C1 is set to the communication opposite parties FQDN1, FQDN12, FQDN13 by, for example, a system administrator.

Also, each communication opposite party FQDN2, FQDN3 is assumed to be, for example, a search server. Further, each communication opposite party FQDN4, FQDN5 is, for example, a government server installed for providing a variety of information by a government office. Such a search server and a government server are servers having a high possibility of executing communication less than one minute. Then, in the example of FIG. 17, a category C3 is set to the communication opposite parties FQDN2, FQDN3 by, for example, a system administrator. Also, in the example of FIG. 17, a category C2 is set to the communication opposite parties FQDN4, FQDN5 by, for example, a system administrator.

(Category-Based Aggregation Record)

By reference to FIGS. 11, 18, a description will be given on a category-based aggregation record.

FIG. 18 is a diagram illustrating an aggregation table in which aggregation records based on each communication opposite party, as denoted with symbols V1, V2, V3 of FIG. 11, are changed into category-based aggregation records which is set to the communication opposite party.

Items included in the category-based aggregation records in FIG. 18 are the 11th item to the 15th item. Each category-based aggregation record is described as, for example,
{the 11th item, the 12th item, the 13th item, the 14th item, the 15th item}.

The 11th item is a category for a communication opposite party. The 12th item is the number of communication opposite parties belonging to the same category in each aggregation record stored in a cell in the aggregation table TT3 of FIG. 11, The 13th item is a communication time (the shortest communication time) which is the shortest among aggregation records including communication opposite parties belonging to the same category, in the aggregation record stored in the cell. The 14th item is a communication time (the longest communication time) which is the longest among aggregation records including communication opposite parties belonging to the same category, in the aggregation record stored in the cell. The 15th item is the total sum of the maximum number of times in aggregation records including communication opposite parties belonging to the same category, in the aggregation record stored in the cell.

The aggregation unit 106 changes each aggregation record which is based on each communication opposite party into a category-based aggregation record of which category is set to the communication opposite party of concern. Specifically, the aggregation unit 106 changes each aggregation record, including communication opposite parties belonging to the same category in the aggregation record stored in the cell in the aggregation table TT3 of FIG. 11, into an aggregation record including the 11th item to the 15th item. The aggregation record after the change is depicted in FIG. 18.

As an example, a description will be given on an aggregation record (refer to symbol V1 in FIG. 11) which is stored in a cell in which the segment T3 intersects with the location 1. The communication opposite parties FQDN2, FQDN3 belong to the category C3, according to the white list WL2 of FIG. 17. The shortest communication time among aggregation records including the communication opposite parties FQDN2, FQDN3 is 0:0:2. Similarly, the longest communication time among the aggregation records including the communication opposite parties FQDN2, FQDN3 is 0:0:7. Further, the maximum number of times among aggregation records including the communication opposite party FQDN2 is 4, and the maximum number of times among aggregation records including the communication opposite party FQDN3 is 4, and therefore, the total number of times in the aggregation records including the communication opposite party belonging to the same category is 8.

Accordingly, as depicted with a symbol V11 in the aggregation record TT4 of FIG. 18, the aggregation unit 106 changes the aggregation records including the communication opposite parties FQDN2, FQDN3 to;
{C3, 2, 0:0:2, 0:0:7, 8 times}.

(Typical Example of Communication Network Decision Processing)

By reference to FIGS. 4, 12, 13 and 18, a typical example of communication network decision processing will be described. After the generation of the aggregation table TT4 of FIG. 18 is completed, the communication control apparatus 100 is assumed to execute the processing of FIGS. 12, 13. Here, the total entry count of the routing table TBL of FIG. 4 is 5. Also, a communication opposite party corresponding to an apparatus identified by apparatus identification information (IP_13) stored in the routing table TBL is assumed to be FQDN13 which belongs to the category C1. In this case, a residual entry count, which is a difference between the total entry count and the number of communication opposite parties corresponding to the apparatus identified by the apparatus identification information stored in the routing table TBL, is 4. Also, a target node is assumed to be FQDN3 which belongs to the category C3.

The processing of step S21 to step S23 of FIG. 12 is executed, in which the decision unit 111 determines whether a communication opposite party specified by a fully qualified domain name included in a DNS request is stored in the white list WL2 (step S24). The communication opposite party FQDN3 (target node FQDN3) is already stored in the white list WL2. Therefore, the decision unit 111 determines YES in step S24, and decides a communication network (step S25).

The decision unit 111 confirms that the residual entry count of the routing table TBL of FIG. 4 is 4, as exemplified above. (step S251 in FIG. 13).

(Extraction of Aggregation Record in Communication Network Decision Processing)

The aggregation data extraction unit 102 extracts, from the aggregation table TT4 of FIG. 18, an aggregation record corresponding to the most recent range to the current time and the current location of the communication control apparatus 100. Further, the decision unit 111 specifies a target node and a counter-node group (step S252). Specifically, the aggregation data extraction unit 102 extracts, from the aggregation table TT4, each category-based aggregation record stored in a cell in which the current location of the communication control apparatus 100 intersects with a segment including the current time. Further, the aggregation data extraction unit 102 extracts each category-based aggregation record stored in two cells in which the current location intersects with segments temporally before and after the segment including the current time.

Here, it is assumed that the current location is a location 1 (SSID1) and the current time is 9:35. In this case, the aggregation data extraction unit 102 extracts all category-based aggregation records depicted in the aggregation table TT4 of FIG. 18.

Specifically, the aggregation data extraction unit 102 extracts, from the aggregation table TT4 of FIG. 18, each category-based aggregation record stored in a cell in which the location 1 (SSID1) intersects with a segment T3 including the current time (9:35).

Further, the aggregation data extraction unit 102 extracts each category-based aggregation record stored in a cell in which the location 1 (SSID1) intersects with a segment T2 temporally before the segment T3 including the current time (9:35). Also, the aggregation data extraction unit 102 extracts each category-based aggregation record stored in a cell in which the location 1 (SSID1) intersects with a segment T4 temporally after the segment T3 including the current time (9:35).

(Specification of Node in Communication Network Decision Processing)

The decision unit 111 specifies a target node and a counter-node group from a plurality of category-based aggregation records extracted above. Here, the decision unit 111 specifies a communication opposite party FQDN3 as target node. Also, the decision unit 111 specifies each communication opposite party belonging to the categories C1, C2, other than the category C3 to which the target node FQDN3 belongs.

The decision unit 111 determines whether it is possible to store the entire of the specified target node and the counter-node group into the routing table TBL of FIG. 4 (step S253). Here, specifically, the decision unit 111 determines whether the residual entry count of the routing table TBL is smaller than and including the total sum of the numeric values in the 12th items of the above extracted category-based aggregation records. In the case of the above example, the residual entry count is 4. Also, the 12th items in the above extracted category-based aggregation records in the aggregation table TT4 of FIG. 18 are 1, 1, 1, 2, 1, 1, 1, respectively, and therefore, the total sum of the above 12th items is 8. Accordingly, the decision unit 111 determines that the residual entry count (4) of the routing table TBL is not smaller than and including the total sum (8) of the 12th items in the above extracted category-based aggregation records (step S253/NO).

(Reaggregation of Aggregation Records in Communication Network Decision Processing)

The decision unit 111 reaggregates the extracted category-based aggregation records (step S254). Specifically, the decision unit 111 specifies a plurality of category-based aggregation records which include the same category. Then, the decision unit 111 specifies, in the plurality of specified category-based aggregation records, the longest time among each longest communication time and the shortest time among each shortest communication time. Then, the decision unit 111 sums up each numeric value in the 12th item included in each specified category-based aggregation record. Further, the decision unit 111 sums up the number of times included in each specified category-based aggregation record.

Namely, the 11th item of the category-based aggregation record after merging is the same category, and the 12th item is the total of each numeric value of the 12th item included in each specified category-based aggregation record. Also, the 13th item of the category-based aggregation record after merging is the specified shortest time among each shortest communication time. Further, the 14th item of the category-based aggregation record after merging is the specified longest time among each longest communication time, and the 15th item is the total of the 15th item included in each specified category-based aggregation record.

Figures 19, 20:
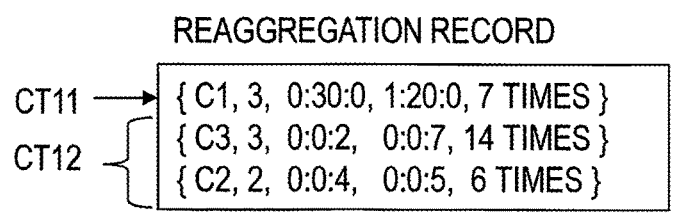
FIG. 19 is a diagram illustrating a category-based reaggregation record.
FIG. 20 is one example of a table illustrating a result after the decision unit 111 executes ranking of three category-based reaggregation records of FIG. 19 based on an evaluation function.

FIG. 19 is a diagram illustrating the category-based reaggregation records. FIG. 19 illustrates three category-based reaggregation records.

When merging the extracted category-based aggregation records described in FIG. 18, namely,
{C1, 1, 0:50:0, 1:00:0, 2 times} and
{C1, 1, 0:35:0, 1:15:0, 3 times} and
{C1, 1, 0:30:0, 1:20:0, 2 times},
the result is
{C1, 3, 0:30:0, 1:20:0, 7 times}.

Also, when merging the extracted communication records described in FIG. 18, namely,
{C2, 1, 0:0:4, 0:0:5, 4 times} and
{C2, 1, 0:0:5, 0:0:5, 2 times},
the result is
{C2, 2, 0:0:4, 0:0:5, 6 times}.

Further, when merging the extracted communication records described in FIG. 18, namely,
{C3, 2, 0:0:2, 0:0:7, 8 times} and
{C3, 1, 0:0:4, 0:0:6, 6 times},
the result is {C3, 3, 0:0:2, 0:0:7, 14 times}.

Here, each category-based aggregation record after merging is appropriately described as category-based reaggregation record.

(Ranking in Communication Network Decision Processing)

The decision unit 111 ranks each category included in the category-based reaggregation records, based on the evaluation function described below (step S255).

The evaluation function classifies a category-based reaggregation record including, for example, the shortest communication time of, for example, one minute or longer, into a first ranking segmentation category. Next, the evaluation function classifies a category-based reaggregation record including, for example, the shortest communication time shorter than, for example, one minute into a ranking segmentation category. Here, the first ranking segmentation category has the same signification as the first category described in the first embodiment, and the second ranking segmentation category has the same signification as the second category described in the first embodiment.

Then, the evaluation function ranks each category-based reaggregation record belonging to the first ranking segmentation category, to each category in such a manner that a communication opposite party having a longer communication time is ranked at a higher place. Next, subsequent to the above ranking, the evaluation function ranks each category-based reaggregation record belonging to the second ranking segmentation category, to each category in such a manner that a communication opposite party having a larger number of communication times is ranked at a higher place.

In the example of FIG. 19, one reaggregation record denoted with a symbol CT11 belongs to the first ranking segmentation category. Also, two category-based reaggregation records denoted with a symbol CT12 belong to the second ranking segmentation category.

FIG. 20 is one example of a table illustrating a result after the decision unit 111 executes the ranking of three category-based reaggregation records of FIG. 19 based on the evaluation function.

A ranking table TO2 includes a ranking column, a category column and a communication opposite party count column.

In FIG. 20, the category of a category-based reaggregation record and the number of communication opposite parties are stored in the same row of the category column and the communication opposite party count column.

In FIG. 20, the 11th item of the category-based reaggregation record is stored in the category column, and the 12th item is stored in the communication opposite party count column.

Ranking by means of the evaluation function will be described specifically. First, in regard to a category-based reaggregation record belonging to the first ranking segmentation category, ranking is made in such a manner that a communication opposite party having a longer communication time is ranked at a higher place. As denoted with the symbol CT11 in FIG. 19, there is one category-based reaggregation record which belongs to the first ranking segmentation category. Therefore, the category C1 is ranked at the first place.

Next, in regard to two category-based reaggregation records belonging to the second ranking segmentation category, ranking is made in such a manner that a category to which a communication opposite party having a larger number of communication times belongs is ranked at a higher place.

As denoted with the symbol CT12 in FIG. 19, the number of communication times in which a category-based reaggregation record including the category C3 is 14 times, and the number of communication times in which a category-based reaggregation record including the category C2 is 6 times.

Therefore, subsequent to the above-mentioned ranking of the communication opposite parties included in one category-based reaggregation record belonging to the first ranking segmentation category, the category C3 is ranked at the second place, and the category C2 is ranked at the third place.

(Decision of Communication Network)

Next, the decision unit 111 determines whether a target node rank is within the residual entry count confirmed in step S251 (step S256). Here, a residual entry count of the routing table TBL of FIG. 4 is assumed to be 4. Also, a target node is assumed to be FQDN3. Now, from FIG. 20, the number of communication opposite parties belonging to the category C1 which is ranked at the first place is 3. Namely, each rank of three communication opposite parties belonging to the category C1 is either one of the first to the third places when based on the communication opposite party.

Also, the category C3 to which the target node FQDN3 belongs is ranked at the second place. Then, because the final rank among the communication opposite parties belonging to the category C1, which is ranked at the first place, is the third place, the target node FQDN3 is ranked in a tie for the fourth place when based on the communication opposite party. Additionally, when the target node is FQDN2, the target node FQDN2 is ranked in a tie for the fourth place.

Accordingly, the rank (4) of the target node FQDN3 is within the residual entry count (4) (step S256/YES), and therefore, the decision unit 111 determines a communication network to be the physical network.

In other words, the decision unit 111 determines a communication network to be the physical network if the total number of communication opposite parties (3 in the above example), which belongs to a category ranked upper than a category to which the communication opposite party (target node) starting communication belongs, is smaller than the residual entry count (4 in the above example) of the routing table TBL of FIG. 4. Then, the decision unit 111 stores the IP address of an apparatus corresponding to the target node into the routing table TBL of FIG. 4.

Meanwhile, a case that a target node is FQDN4 is assumed. The target node FQDN4 belongs to the category C2, and the rank of the category C2 is the third place. There are three communication opposite parties belonging to the category C3 ranked at the second place. Then, because the final rank among the communication opposite parties belonging to the category C1, which is ranked at the second place, is the sixth place, the target node FQDN3 is ranked in a tie for the seventh place when based on the communication opposite party. Accordingly, it is determined that the rank (7) of the target node FQDN4 is not within the residual entry count (4) (step S256/NO), a communication network is decided to be the VPN network (step S258).

By the decision of the communication network, the processing of step S25 of FIG. 12 (in other words, steps S251-S258 of FIG. 13) is completed.

The processing of step S258 and after being described in detail in the first embodiment, and therefore the description thereof will be omitted.

As being described, the decision unit 111 classifies, into each category, each communication result which includes a communication start time belonging to a predetermined time range corresponding to the current time among each of the communication information of the communication opposite party, based on the category identifier which is set corresponding to the communication opposite party identification information. Incidentally, the predetermined time range corresponding to the current time among each communication result of the second apparatus is, in the example of FIG. 18, a time range denoted with each segment T1, T2, T3 when the current time is 9:35. The category identifier which is set corresponding to the communication opposite party identification information is an identifier for identifying each category, as described in the white list WL2 of FIG. 17.

Further, the decision unit 111, by using the above-mentioned evaluation function, ranks each category based on the communication time of the communication opposite party belonging to the category and the number of times of communication of the communication opposite party of concern in each category. Here, each category is a reaggregation record category denoted with each symbol CT11, CT12 in the example of FIG. 19.

Then, the decision unit 111 determines whether to store into the TBL storage unit 108 the apparatus identification information of the second apparatus starting communication, based on the rank value of each category, the total number of communication opposite parties belonging to each category and the information amount of the apparatus identification information which can be stored in the TBL storage unit 108.

Here, the information amount of the apparatus identification information which can be stored is, for example, the number of apparatus identifiers (for example, IP addresses) of the second apparatuses which can be stored in the TBL storage unit 108. In the example of FIG. 4, the number of identifiers of the second apparatuses which can be stored in the TBL storage unit 108 is the residual entry count of the routing table TBL. As to the rank value of each category, in the example of FIG. 19, the rank (value) of the category C1 is the first place, the rank of the category C3 is the second place, and the rank of the category C2 is the third place. Further, as to the total number of second apparatuses belonging to each category, in the example of FIG. 19, the total number of second apparatuses belonging to the category C1 is 3, the total number of second apparatuses belonging to the category C3 is 3, and the total number of second apparatuses belonging to the category C2 is 2.

In the ranking, for a category including a communication time longer than and including a predetermined time among each category, the decision unit 111 performs ranking based on a first ranking criterion. The communication time of a predetermined time or longer is, in the examples of FIGS. 19, 20, the shortest communication time, and the predetermined time is, for example, one minute.

Here, the first ranking criterion is a criterion for ranking each category, including the communication time of the predetermined time or longer, in order from the longest communication time to the shortest. In the example of FIG. 19, the category C1 is set to be the first place.

Also, for a category including a communication time shorter than a predetermined time among each category, the decision unit 111 performs ranking based on a second ranking criterion which is different from the first criterion. Here, the second ranking criterion is a criterion for performing ranking in order from the largest number of communication times to the smallest subsequent to the ranking based on the first ranking criterion, with respect to a category including the communication time shorter than the predetermined time among each category. In the example of FIG. 20, subsequent to the above-mentioned ranking (following the first place), the category C3 is ranked at the second place, and the category C2 is ranked at the third place.

When the total number of communication opposite parties belonging to each category is smaller than and including the number of identifiers of the second apparatuses which can be stored in the TBL storage unit 108 (step S253/YES in FIG. 13 and step S26/YES in FIG. 12), the decision unit 111 stores the identifier of the second apparatus starting communication into the TBL storage unit 108 (step S28 in FIG. 12).

Also, when the total number of communication opposite parties, belonging to each category ranked upper than the rank of the category to which the communication opposite party starting communication belongs, is smaller than the number of identifiers of the second apparatuses which can be stored in the TBL storage unit 108 (step S256/YES in FIG. 13 and step S26/YES in FIG. 12), the decision unit 111 stores the identifier of the second apparatus starting communication into the TBL storage unit 108 (step S28 in FIG. 12).

According to the present embodiment, the communication control apparatus sets a category for decision simplification, to each communication opposite parry. Then, the communication control apparatus generates the aggregation record in each the category. This enables the suppression of an increased number of aggregation records to be extracted, and the suppression of an increased processing load of the aggregation record reaggregation processing (step S254) and the rank decision processing (step S255). As a result, it is possible to prevent a delay in the communication network decision processing.

Third Embodiment

According to the first and second embodiments, the communication control apparatus 100 executes a variety of types of processing (for example, aggregation processing and communication network decision processing) related to the communication packet transfer processing and the routing table update processing. However, when a data amount for communication results is large and a time range in each aggregation segment is long, each load of the aggregation processing and the communication network decision processing becomes high, and the processing load of the communication control apparatus 100 increases. Accordingly, the aggregation processing and the communication network decision processing having a possibility of an increased load are executed by another apparatus.

(System)

Figure 21:
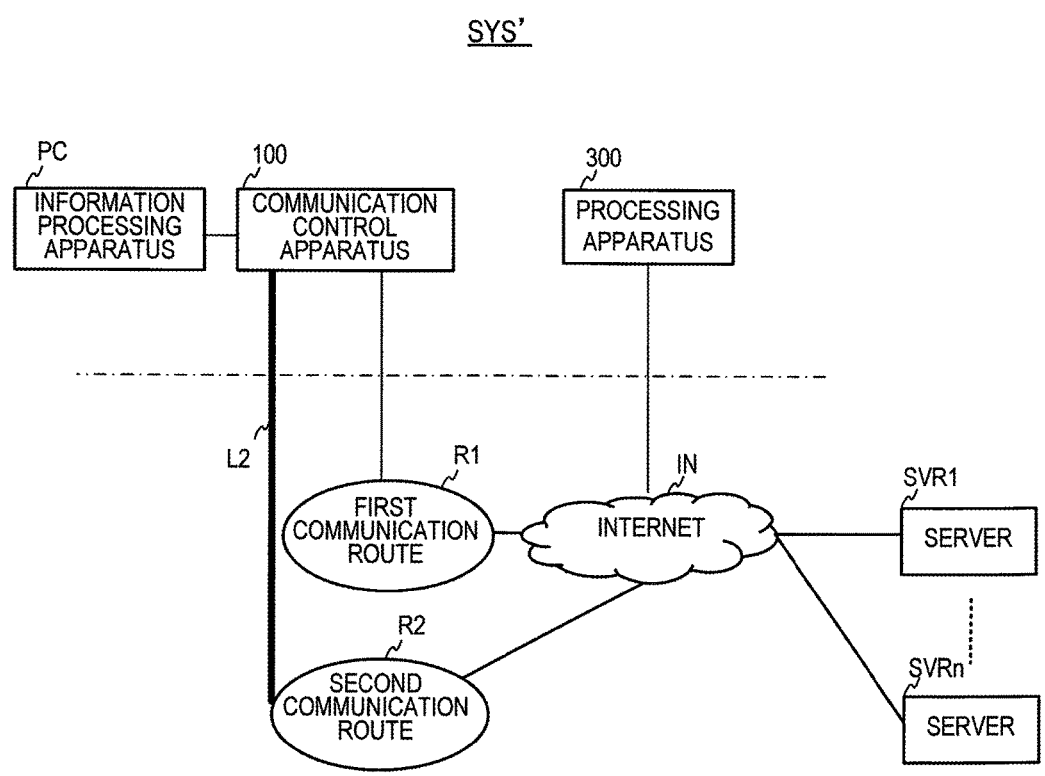
FIG. 21 is a diagram illustrating a communication system according to the present embodiment.

FIG. 21 is a diagram illustrating a communication system according to the present embodiment. A user side system SYS' described on the upper side of the alternate long and short dash line includes an information processing apparatus PC, a communication control apparatus 100' and a processing apparatus 300. The communication control apparatus 100' is disposed between the information processing apparatus PC and each of a first communication route R1 and a second communication route R2, to perform transfer processing for a communication packet. The processing apparatus 300 connects to the Internet IN to communicate with the communication control apparatus 100' to perform data processing. Specifically, the processing apparatus 300 executes communication network decision processing.

The communication control apparatus 100' and the processing apparatus 300 are mutually communicable through the Internet IN and the first communication route R1. Here, the processing apparatus 300 may be located within the second communication route R2.

The user side system SYS' executes processing which the communication control apparatus 100 executes in the first embodiment and the second embodiment.

Figure 22:
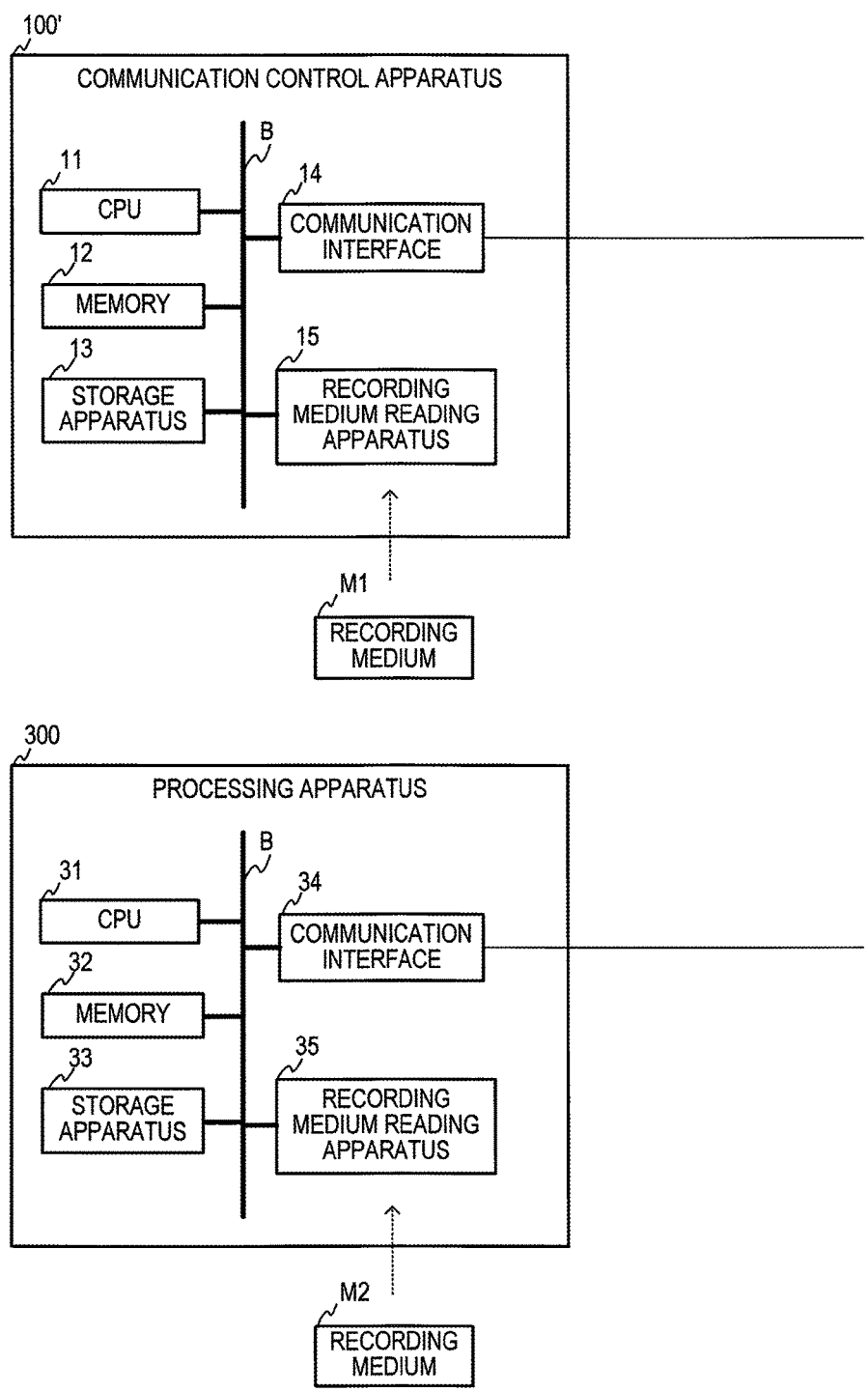
FIG. 22 illustrates one example of each hardware block diagram of a communication control apparatus 100' and a processing apparatus 300.

FIG. 22 illustrates one example of each hardware block diagram of the communication control apparatus 100' and the processing apparatus 300. Though the hardware configuration of the communication control apparatus 100' is the same as depicted in FIG. 2, a communication interface 14 also performs communication processing with a communication interface 34 of the processing apparatus 300 also.

The processing apparatus 300 includes a CPU 31, a memory 32, a storage apparatus 33, the communication interface 34 and a recording medium reading apparatus 35 which are interconnected through a bus B, for example.

The CPU 31 is a computer (control unit) which controls the whole processing apparatus 300. The memory 32 temporarily stores data, processed through a variety of types of information processing executed by the CPU 31, and a variety of programs. Also, the memory 32 stores a ranking table.

The storage apparatus 33 is, for example, a magnetic storage apparatus such as a hard disk drive, and a nonvolatile memory. The storage apparatus 33 stores a white list, a communication result table and an aggregation table. Here, the white list is described in FIGS. 3 and 17. The communication result table is described in FIG. 9. The routing table is described in FIG. 4. The aggregation table is described in FIGS. 8, 10, 11 and 18. The ranking table is described in FIGS. 16 and 20. In addition, the storage apparatus 33 stores each program which will be described in FIG. 23.

The communication interface 34 is an apparatus which performs communication processing with the first communication route R1. When the processing apparatus 300 includes a wired communication function for example, the communication interface 34 is what is called a network interface card. Also, when the processing apparatus 300 includes a radio communication function, the communication interface 34 is, for example, a wireless LAN slave unit.

The recording medium reading apparatus 35 is an apparatus which reads data recorded on a recording medium M2. The recording medium M2 is a portable recording medium.

Figure 23:
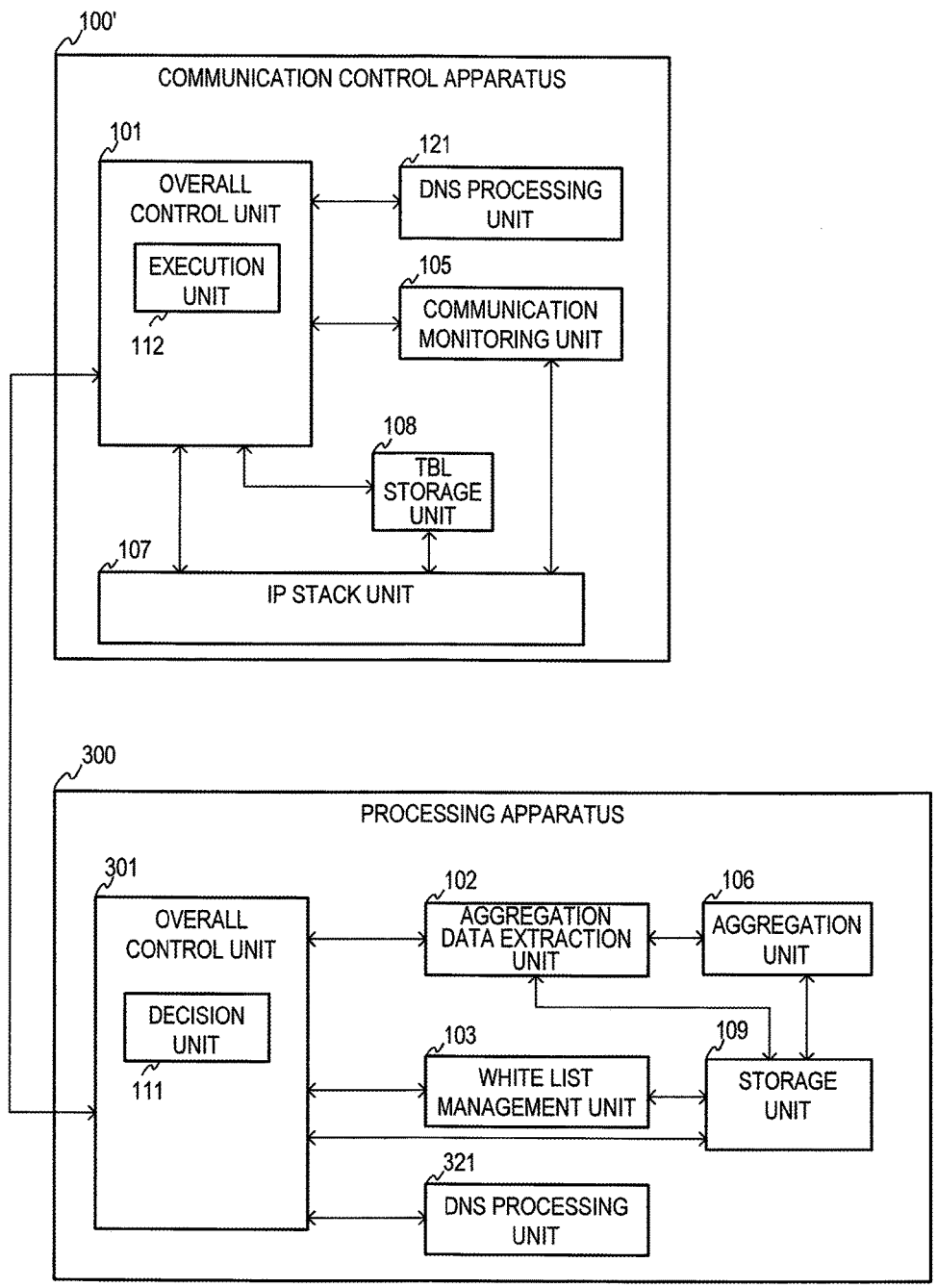
FIG. 23 is one example of block diagram of each software module which a communication control apparatus 100' and a processing apparatus 300 of FIG. 22 execute.

FIG. 23 is one example of the block diagram of each software module which the communication control apparatus 100' and the processing apparatus 300 of FIG. 22 execute.

In the communication control apparatus 100, an overall control unit 101, an execution unit 112, a communication monitoring unit 105, an IP stack unit 107 and a DNS processing unit 121 are what is called programs, and these programs are stored in, for example, the storage apparatus 13. Here, the programs may be stored in the recording medium M2. The overall control unit 101 executes processing for communicating with the overall control unit 301 of the processing apparatus 300.

The CPU 11 of FIG. 22 reads out the above programs from the storage apparatus 13 at the time of activation, and expands to the memory 12, to cause the above programs to function as software modules.

In the processing apparatus 300, an overall control unit 301, a decision unit 111, an aggregation data extraction unit 102, a white list management unit 103, an aggregation unit 106 and a DNS processing unit 321 are what is called programs, and the above programs are stored in the storage apparatus 33, for example. Incidentally, the programs may be stored in the recording medium M2. The overall control unit 301 executes processing for communicating with the overall control unit 101 of the communication control apparatus 100'.

The CPU 31 of FIG. 22 reads out the above programs from the storage apparatus 33 at the time of activation, and expands to the memory 32, to allow the above programs to function as software modules.

The overall control unit 101 of the communication control apparatus 100' performs communication processing with the overall control unit 301 of the processing apparatus 300. Similarly, the overall control unit 301 of the processing apparatus 300 performs communication processing with the overall control unit 101 of the communication control apparatus 100'.

The DNS processing unit 121 and the communication monitoring unit 105 of the communication control apparatus 100' can perform data transmission and reception between with each function block of the processing apparatus 300, through the overall control unit 101 and the overall control unit 301, and further can access the storage apparatus 13 and the storage apparatus 33. The aggregation data extraction unit 102, the white list management unit 103, the aggregation unit 106 and the DNS processing unit 321 of the processing apparatus 300 can perform data transmission and reception between with each function block of the communication control apparatus 100, through the overall control unit 301 and the overall control unit 101, and further, can access the storage apparatus 13 and the storage apparatus 33.

For example, the DNS processing unit 121 of the communication control apparatus 100, on receiving a DNS request from the information processing apparatus PC (step S21 in FIG. 12), instructs the DNS processing unit 321 of the processing apparatus 300 to transfer the DNS request to a DNS server. The DNS processing unit 321 of the processing apparatus 300 receives the instruction, and transfers the DNS request to the DNS server (step S22). The DNS processing unit 321 acquires a DNS response transmitted from the DNS server (step S23), to transmit to the DNS processing unit 121 of the communication control apparatus 100'. Thereafter, the DNS processing unit 121 transfers the received DNS response to the information processing apparatus PC.

The communication monitoring unit 105 of the communication control apparatus 100' collects each communication result described in FIG. 6, to store into the storage unit 109 of the processing apparatus 300, as the communication result table TR1 of FIG. 9. In other words, the communication monitoring unit 105 of the communication control apparatus 100' transmits to the processing apparatus 300 communication information related to communication with the second apparatus with which the communication is performed.

The overall control unit 101 of the communication control apparatus 100' further transmits to the processing apparatus 300 an information amount of apparatus identification information which can be stored in the TBL storage unit 108. Here, the information amount of the apparatus identification information which can be stored in the TBL storage unit 108 is the residual entry count described in the routing table TBL of FIG. 4.

The aggregation unit 106 of the processing apparatus 300 performs communication result aggregation processing described in FIG. 7, and generates and updates the aggregation table described in FIGS. 8-11.

The decision unit 111 of the processing apparatus 300 transmits to the communication control apparatus 100' the determination result of determining whether to store the apparatus identification information of the second apparatus starting communication into the TBL storage unit 108, based on the communication information and the information amount transmitted from the communication control apparatus 100'. Specifically, the decision unit 111 executes the processing of step S24 in FIG. 12. Then, as described in step S252, the aggregation data extraction unit 102 extracts, from the aggregation table, each aggregation record corresponding to the most recent range to the current time and the current location of the communication control apparatus 100. Further, the decision unit 111 specifies a target node and a counter-node group. Next, the decision unit 111 executes the processing of step S253 and after. Here, the decision unit 111 transmits to the communication control apparatus 100' the determination result of determining that either a communication network is the physical network (step S257) or a communication network is the VPN network (step S258).

The execution unit 112 of the communication control apparatus 100' executes the processing of step S26 and after. When the communication network is determined to be the physical network (step S257 in FIG. 13), the execution unit 112 stores an IP address of the apparatus corresponding to the target node, into the routing table TBL of FIG. 4.

Now, the CPU 31 of the processing apparatus 300 has higher performance than the CPU 11 of the communication control apparatus 100. Also, the memory 32 and the storage apparatus 33 of the processing apparatus 300 have higher performance than the memory 12 and the storage apparatus 13 of the communication control apparatus 100. Therefore, the processing apparatus 300 can execute, at a high speed, aggregation processing and communication network decision processing in which a processing amount becomes larger. As a result, the communication control apparatus 100' may perform a processing without performing the aggregation processing and the communication network decision processing (in other words, the reduction of a processing load), so that the deterioration of the processing speed of communication processing can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention is described in detail, it should be understood that the various changes, substitutions, and alterations could be made hereto without departing from the spirit and scope of the invention.

What is claimed is:

1. A communication control apparatus for determining a communication route from a first apparatus to a second apparatus based on apparatus identification information identifying the second apparatus, the communication control apparatus comprising:
    a table storage unit configured to store the apparatus identification information;
    a storage unit configured to store communication time indicating a time from a start time of communication with the second apparatus to an end time of the communication and a communication frequency of the communication to the second apparatus, as communication information of the communication to the second apparatus with which the communication is performed; and
    a control unit configured to determine whether or not the control unit is configured to store the apparatus identification information of the second apparatus starting the communication in the table storage unit based on the communication time and communication frequency stored in the storage unit, and a number of the apparatus identification information capable of storing in the table storage unit, wherein
    the control unit is configured to store in the storage unit the communication opposite party identification information identifying a communication opposite party corresponding to the second apparatus and information identifying communication start time of communication to the communication opposite party, and determine whether or not the apparatus identification information of the second apparatus starting the communication is stored in the table storage unit based on the communication time including the communication start time belonging to a predetermined time range corresponding to a current time in each the communication time of the communication opposite party and the number of the apparatus identification information capable of storing in the table storage unit, and
    the control unit is configured to rank to a specific communication opposite party and an opposite party starting the communication based on the communication time and communication frequency to the specific opposite party specified by the communication opposite identification information included in the communication time including the communication start time belonging to the predetermined time range corresponding to the current time in each the communication time of the communication opposite party, and determine whether or not the apparatus identification information of the second apparatus starting the communication is stored in the table storage unit based on a rank value of the communication opposite party starting the communication and the number of the apparatus identification information capable of storing in the table storage unit.

2. The communication control apparatus according to claim 1, wherein
    the control unit is configured to rank, based on a first ranking criterion, to the communication opposite party included in the communication information including the communication time equal to or longer than a predetermined time in each the communication information of the specific communication opposite party, and rank, based on a second ranking criterion different from the first ranking criterion, to the communication opposite party included in the communication information including the communication time shorter than the predetermined time in each the communication information of the specific communication opposite party.

3. The communication control apparatus according to claim 2, wherein
    the first ranking criterion is a criterion for ranking in order from the longest communication time, to the communication opposite party included in the communication information including the communication time equal to or longer than the predetermined in each the communication information of the specific communication opposite party, and
    the second ranking criterion is a criterion for ranking in order from the largest number of the communication times, subsequent to the ranking according to the first ranking criterion, to the communication opposite party included in the communication information including the communication time shorter than the predetermined time in each the communication information of the specific communication opposite party.

4. The communication control apparatus according to claim 3, wherein
one of the apparatus identification information is one of an identifier of the second apparatus, and the information amount of the apparatus identification information capable of storing in the table storage unit is a number of the identifiers of the second apparatus capable of storing in the table storage unit, and
the control unit is configured to store the identifier of the second apparatus starting the communication, when the rank value of the communication opposite party corresponding to the second apparatus starting the communication is equal to or less than the number of the identifiers of the second apparatus capable of storing in the table storage unit.

5. The communication control apparatus according to claim 1, wherein
one of the apparatus identification information is one of an identifier of the second apparatus, and the information amount of the apparatus identification information capable of storing in the table storage unit is a number of the identifiers of the second apparatus capable of storing in the table storage unit, and
the control unit is configured to store the identifier of the second apparatus starting the communication in the table storage unit, when a sum of a number of the specific communication opposite parties and a number of the communication opposite parties starting the communication is equal to or less than a number of the identifiers of the second apparatus capable of storing in the table storage unit.

6. The communication control apparatus according to claim 1, wherein
the control unit is configured to store in the storage unit the communication information including communication opposite party identification information identifying a communication opposite party corresponding to the second apparatus, information identifying a communication start time of the communication to the communication party, and the communication time and number of communication times to the communication opposite party, classify each the communication information including the communication start time belonging to a predetermined time corresponding to a current time in each the communication information of the communication opposite party, into each category based on a category identifier set corresponding to the communication opposite party identification information, rank each the category based on the communication time of the communication opposite party belonging to the category and the number of communication times of the communication opposite party, and determine whether or not the apparatus identification information of the second apparatus starting the communication is stored in the table storage unit based on a rank value of each the category, a total number of the communication opposite parties belonging to each the category, and the information amount of the apparatus identification information capable of storing the table storage unit.

7. The communication control apparatus according to claim 6, wherein
the control unit is configured to rank, based on a first ranking criterion, to the category including the communication time equal to or longer than a predetermined time in each the category, and rank, based on a second ranking criterion different from the first ranking criterion, to the category including the communication time less than the predetermined time in the each category.

8. The communication control apparatus according to claim 7, wherein
the first ranking criterion is a criterion for ranking in order from the longest communication time, to the category including the communication time equal to or longer than the predetermined time in each the category, and
the second ranking criterion is a criterion for ranking in order from the largest number of the communication times, subsequent to the ranking according to the first ranking criterion, to the category including the communication time less than the predetermined time in the each category.

9. The communication control apparatus according to claim 8, wherein
one of the apparatus identification information is one of an identifier of the second apparatus, and the information amount of the apparatus identification information capable of storing in the table storage unit is a number of the identifiers of the second apparatus capable of storing in the table storage unit, and
the control unit is configured to store the identifier of the second apparatus starting the communication in the table storage unit, when a sum of a number of the communication opposite parties belonging to the each category is equal to or less than a number of the identifiers of the second apparatus capable of storing in the table storage unit.

10. The communication control apparatus according to claim 8, wherein
one of the apparatus identification information is one of an identifier of the second apparatus, and the information amount of the apparatus identification information capable of storing in the table storage unit is a number of the identifiers of the second apparatus capable of storing in the table storage unit, and
the control unit is configured to store the identifier of the second apparatus starting the communication in the table storage unit, when a sum of a number of the communication opposite parties belonging to the category ranked upper than the category to which the communication opposite party starting the communication belongs is less than the number of identifiers of the second apparatus capable of storing in the table storage unit, in the each category.

11. A communication control method performed by a communication control apparatus for determining a communication route from a first apparatus to a second apparatus based on apparatus identification information identifying the second apparatus, the method comprising:
determining whether or not the communication control apparatus stores the apparatus identification information of the second apparatus starting communication in a table storage unit based on communication time indicating a time from a start time of communication with the second apparatus to an end time of the communication and a communication frequency of the communication to the second apparatus, and a number of the apparatus identification information capable of storing in a table storage unit storing the apparatus identification information, by the communication control apparatus, wherein the communication control apparatus is configured to store in a storage unit the communication opposite party identification information identifying a communication opposite party corresponding to the second apparatus and information identifying communication start time of communication to the communication opposite party, and determine whether or not the apparatus identification information of the second apparatus starting the communication is stored in the table storage unit based on the communication time including the communication start time belonging to a predetermined time range corresponding to a current time in each the communication time of the communication opposite party and the number of the apparatus identification information capable of storing in the table storage unit, and the communication control apparatus is configured to rank to a specific communication opposite party and an opposite party starting the communication based on the communication time and communication frequency to the specific opposite party specified by the communication opposite identification information included in the communication time including the communication start time belonging to the predetermined time range corresponding to the current time in each the communication time of the communication opposite party, and determine whether or not the apparatus identification information of the second apparatus starting the communication is stored in the table storage unit based on a rank value of the communication opposite party starting the communication and the number of the apparatus identification information capable of storing in the table storage unit.

12. A communication system comprising:

a communication control apparatus configured to determine a communication route from a first apparatus to a second apparatus based on apparatus identification information identifying the second apparatus; and a processing apparatus configured to communicate with the communication control apparatus and perform data processing, wherein the communication control apparatus includes:

a table storage unit configured to store the apparatus identification information, and a control unit configured to transmit to the processing apparatus communication time indicating a time from a start time of communication with the second apparatus to an end time of the communication and a communication frequency of the communication to the second apparatus, as communication information of communication to the second apparatus with which the communication is performed and an information amount of the apparatus identification information capable of storing in the table storage unit, the processing apparatus includes:

a control unit configured to transmit to the communication control apparatus a determination result determining whether or not the control unit stores the apparatus identification information of the second apparatus starting the communication in the table storage unit based on the communication time and communication frequency transmitted from the communication control apparatus, and a number of the apparatus identification information capable of storing in the table storage unit, and the control unit of the communication control apparatus is configured to store the apparatus identification information of the second apparatus starting the communication in the table storage unit based on the determination result, wherein the control unit is configured to store in a storage unit of the communication control apparatus the communication opposite party identification information identifying a communication opposite party corresponding to the second apparatus and information identifying communication start time of communication to the communication opposite party, and determine whether or not the apparatus identification information of the second apparatus starting the communication is stored in the table storage unit based on the communication time including the communication start time belonging to a predetermined time range corresponding to a current time in each the communication time of the communication opposite party and the number of the apparatus identification information capable of storing in the table storage unit, and the control unit is configured to rank to a specific communication opposite party and an opposite party starting the communication based on the communication time and communication frequency to the specific opposite party specified by the communication opposite identification information included in the communication time including the communication start time belonging to the predetermined time range corresponding to the current time in each the communication time of the communication opposite party, and determine whether or not the apparatus identification information of the second apparatus starting the communication is stored in the table storage unit based on a rank value of the communication opposite party starting the communication and the number of the apparatus identification information capable of storing in the table storage unit.

* * * * *